(12) United States Patent
Ingale et al.

(10) Patent No.: US 12,219,465 B2
(45) Date of Patent: Feb. 4, 2025

(54) METHOD AND APPARATUS FOR DETERMINING CELL IN A WIRELESS COMMUNICATION SYSTEM

(71) Applicant: Samsung Electronics Co., Ltd., Suwon-si (KR)

(72) Inventors: Mangesh Abhimanyu Ingale, Bangalore (IN); Anil Agiwal, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 386 days.

(21) Appl. No.: 17/628,180

(22) PCT Filed: Jul. 17, 2020

(86) PCT No.: PCT/KR2020/009451
§ 371 (c)(1),
(2) Date: Jan. 18, 2022

(87) PCT Pub. No.: WO2021/010789
PCT Pub. Date: Jan. 21, 2021

(65) Prior Publication Data
US 2022/0272612 A1    Aug. 25, 2022

(30) Foreign Application Priority Data

Jul. 18, 2019 (IN) .............................. 201941028916
Jul. 10, 2020 (IN) .............................. 201941028916

(51) Int. Cl.
*H04W 48/10* (2009.01)
*H04W 48/02* (2009.01)
*H04W 48/20* (2009.01)

(52) U.S. Cl.
CPC .......... *H04W 48/10* (2013.01); *H04W 48/02* (2013.01); *H04W 48/20* (2013.01)

(58) Field of Classification Search
CPC ..... H04W 48/02; H04W 48/10; H04W 48/12; H04W 48/20
See application file for complete search history.

(56) References Cited

U.S. PATENT DOCUMENTS

| 8,774,810 B2 | 7/2014 | Jeong et al. |
| 2018/0132168 A1 | 5/2018 | Ingale et al. |
| 2019/0350018 A1* | 11/2019 | Moosavi ............... H04W 76/11 |

FOREIGN PATENT DOCUMENTS

| CN | 101584134 A | 11/2009 |
| WO | 2009001269 A2 | 12/2008 |

OTHER PUBLICATIONS

TS (3GPP TS 38.331, "Radio Resource Control (RRC) protocol specification," Release 15, V15.1.0, Mar. 2018) (Year: 2018).*

(Continued)

*Primary Examiner* — Nader Bolourchi

(57) ABSTRACT

In an exemplary embodiment, the method performed by a User equipment (UE) in a wireless communication system is disclosed. The method comprises receiving a system information block 1 (SIB 1) which is broadcasted from a base station (BS) of a cell and identifying whether the cell is a Non-Public Network (NPN) cell based on whether information of a NPN is included in the SIB 1, wherein the NPN cell is a cell allowed to be accessed by the UE in the NPN. Also the method further comprises accessing the cell, when the cell is identified as the NPN cell.

13 Claims, 21 Drawing Sheets

(56) References Cited

OTHER PUBLICATIONS

International Search Report and Written Opinion of the International Searching Authority dated Oct. 26, 2020, in connection with International Application No. PCT/KR2020/009451, 10 pages.
Ericsson, "Submission for information on Commonalities in solutions for Non-Public Network deployments," R2-1907313, 3GPP TSG-RAN WG2 #106, Reno, USA, May 13-17, 2019, 10 pages.
Intel Corporation, "RAN2 impact on Non-Public Network Deployment using CAG," R2-1900761, 3GPP TSG RAN WG2 Meeting #105, Athens, Greece, Feb. 25-Mar. 1, 2019, 6 pages.
LG Electronics, "Correction to NPN access for initial configuration and multiple IDs," S2-1903423, 3GPP TSG-SA WG2 Meeting #132, Apr. 8-12, 2019, Xi'an, China, 7 pages.
Samsung, "Cell Barring in NR-U," R2-1905718, 3GPP TSG-RAN2 106, Reno, USA, May 13-17, 2019, 3 pages.
ZTE, "Consideration on support CAG in NR," R3-190262, 3GPP TSG-RAN WG3 #103, Athens, Greece, Feb. 25-Mar. 1, 2019, 4 pages.
The First Office Action dated Feb. 23, 2024, in connection with Chinese Application No. 202080052124.8, 18 pages.
Supplementary European Search Report dated Aug. 30, 2022, in connection with European Application No. 20840424.4, 17 pages.
Intel Corporation, "RAN2 impact on Non-Public Network Deployment using SNPN," R2-1900760, 3GPP TSG RAN WG2 Meeting #105, Athens, Greece, Feb. 25-Mar. 1, 2019, 5 pages.
Mediatek Inc, "Considerations on emergency services and limited service state for Npn," S2-1905213 (revision of 82-19nnnn), SA WG2 Meeting #133, Reno, NV, USA, May 13-17, 2019, 5 pages.
Samsung Electronics, "Correction to UE behavior for barred cell," R2-1818998, 3GPP TSG-RAN2 104, Spokane, USA, Nov. 12-16, 2018, 4 pages.
Samsung, "Discussion on signalling to enable NPN/CAG support in NR," R2-1911311, 3GPP TSG-RAN WG2 Meeting #107, Prague, Czech Republic, Aug. 26-30, 2019, 4 pages.
Samsung, et al., "Update of Solution #4: Support of NPN subscription," S2-1813179 (was S2-1813165), SA WG2 Meeting #129bis, West Palm Beach, USA, Nov. 26-30, 2018, 6 pages.
Notification of the Decision to Grant dated Sep. 23, 2024, in connection with Chinese Patent Application No. 202080052124.8, 7 pages.

\* cited by examiner

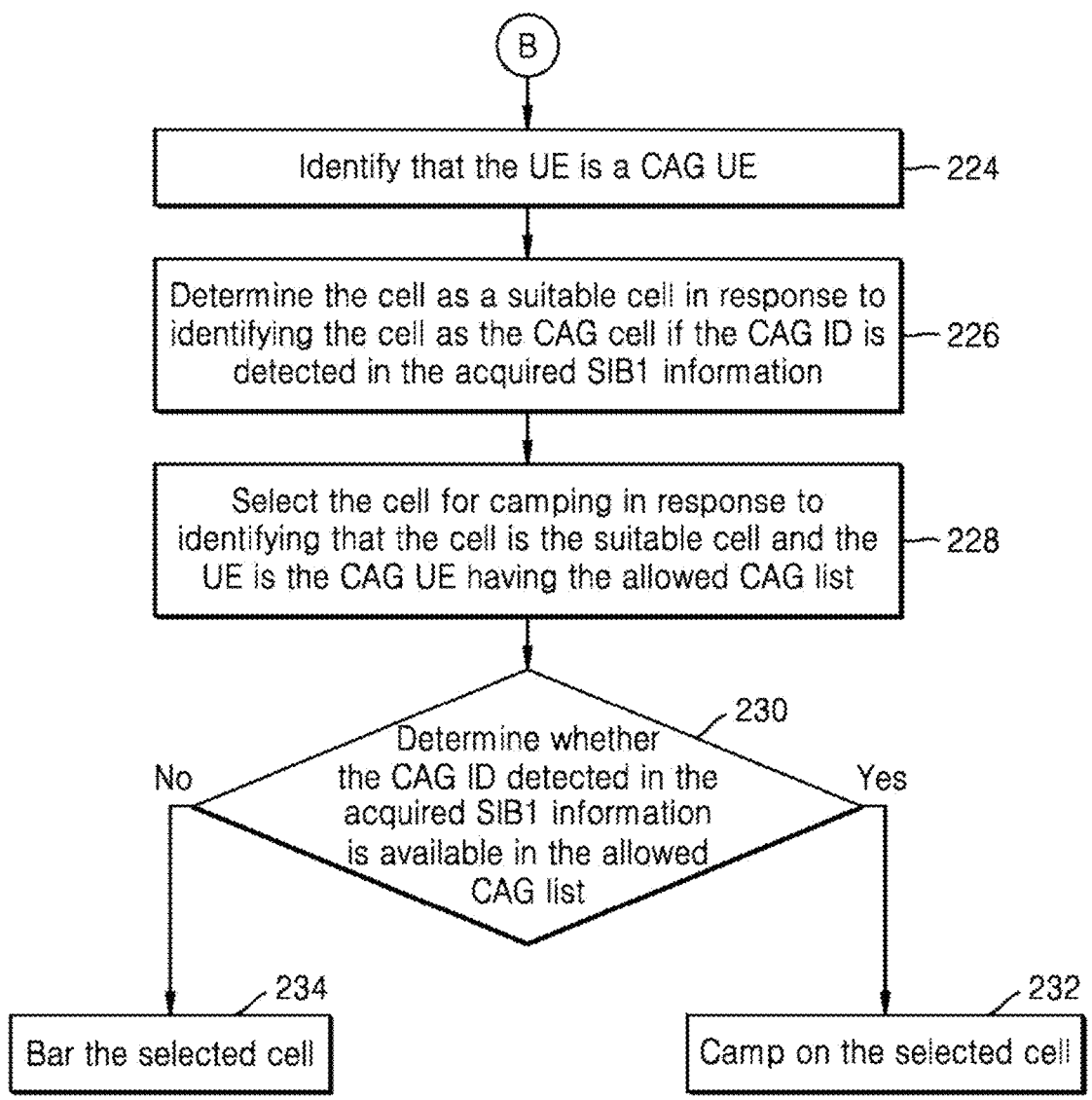

METHOD AND APPARATUS FOR DETERMINING CELL IN A WIRELESS COMMUNICATION SYSTEM

CROSS-REFERENCE TO RELATED APPLICATIONS

This application is a 371 of International Application No. PCT/KR2020/009451, filed Jul. 17, 2020, which claims priority to Indian Patent Application No. 201941028916, filed Jul. 18, 2019, and Indian Patent Application No. 201941028916, filed Jul. 10, 2020, the disclosures of which are herein incorporated by reference in their entirety.

BACKGROUND

1. Field

The present disclosure relates to a wireless communication system, and more specifically related to a method and a User Equipment (UE) for determining cell suitability for cell selection in a wireless communication system.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

SUMMARY

In an exemplary embodiment, the method performed by a User equipment (UE) in a wireless communication system is disclosed. The method comprises receiving a system information block 1 (SIB 1) which is broadcasted from a base station (BS) of a cell and identifying whether the cell is a Non-Public Network (NPN) cell based on whether information of a NPN is included in the SIB 1, wherein the NPN cell is a cell allowed to be accessed by the UE in the NPN. Also the method further comprises accessing the cell, when the cell is identified as the NPN cell.

BRIEF DESCRIPTION OF THE DRAWINGS

This disclosure is illustrated in the accompanying drawings, throughout which like reference letters indicate corresponding parts in the various figures. The embodiments herein will be better understood from the following description with reference to the drawings, in which:

FIGS. 2A to 2G are flow charts illustrating a method for determining cell suitability for cell selection or cell reselection in a wireless communication system, according to an embodiment as disclosed herein;

DETAILED DESCRIPTION

Figure 1:
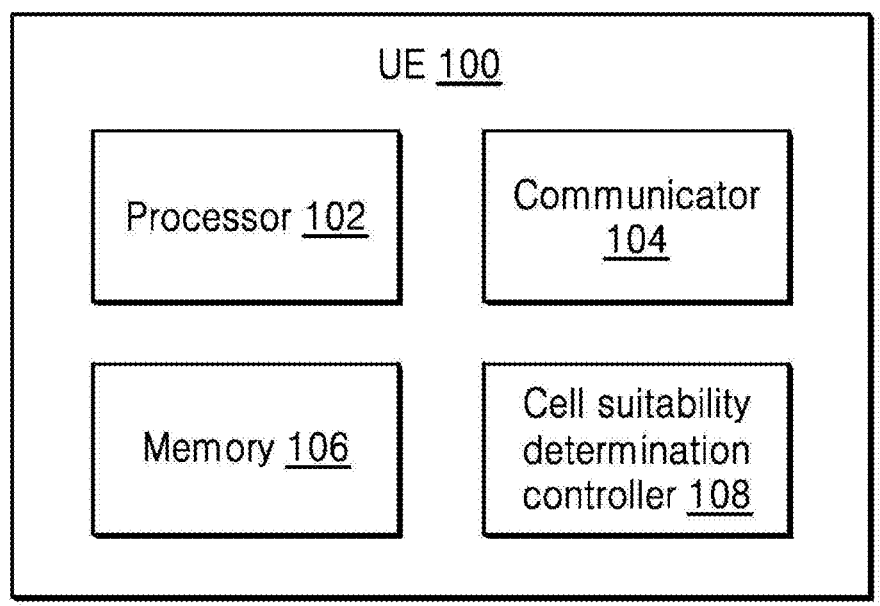
FIG. 1 illustrates various hardware components of a UE for determining cell suitability for cell selection or cell reselection in a wireless communication system, according to an embodiment as disclosed herein.

Accordingly, the embodiment herein disclose a method for determining cell suitability for cell selection in a wireless communication system by a UE. The method includes acquiring, by the UE, a SIB1 information from a cell when a configuration of a cellBarred bit is notBarred in a MIB. Further, the method includes detecting, by the UE, whether one of a NPN ID and a CAG ID is available in the acquired SIB1 information. Further, the method includes performing, by the UE, one of: identifying, by the UE, the cell as a NPN cell if the NPN ID is detected in the acquired SIB1 information, identifying, by the UE, the cell as a CAG cell if the CAG ID is detected in the acquired SIB1 information, and identifying, by the UE, the cell as a PLMN cell if the NPN ID or the CAG ID is not detected in the acquired SIB1 information.

In an embodiment, the method includes identifying, by the UE, that the UE is a NPN UE. Further, the method includes determining, by the UE, the cell as a suitable cell in response to identifying the cell as the NPN cell if the NPN ID is detected in the acquired SIB1 information. Further, the method includes selecting, by the UE, the cell for camping in response to identifying that the cell is the suitable cell and the UE is the NPN UE.

In an embodiment, the method includes identifying, by the UE, that the UE is a CAG UE. The method includes determining, by the UE, the cell as a suitable cell in response to identifying the cell as the CAG cell if the CAG ID is detected in the acquired SIB1 information. Further, the method includes selecting, by the UE, the cell for camping in response to identifying that the cell is the suitable cell and the UE is the CAG UE having the allowed CAG list.

In an embodiment, the method includes identifying, by the UE, that the UE is a non NPN UE or a non CAG UE. Further, the method includes determining, by the UE, the cell as a suitable cell in response to identifying the cell as the PLMN cell if the NPN ID or CAG ID is not detected in the acquired SIB1 information. Further, the method includes selecting, by the UE, the cell for camping in response to identifying that the cell is the suitable cell and the UE is the non NPN UE or the non CAG UE.

In an embodiment, the method includes identifying, by the UE, that the UE is a non NPN UE or a non CAG UE. Further, the method includes determining, by the UE, the cell as not suitable cell in response to identifying the cell as the NPN cell or the CAG cell if the NPN ID or the CAG ID is detected in the acquired SIB1 information. Further, the method includes barring, by the UE, the cell for camping in response to identifying that the cell is not suitable cell and the UE is the non NPN UE or the non CAG UE.

In an embodiment, the method includes identifying, by the UE, that the UE is a NPN UE. Further, the method includes determining, by the UE, the cell as not suitable cell in response to identifying the cell as the PLMN cell if the NPN ID is not detected in the acquired SIB1. Further, the method includes barring, by the UE, the cell for camping in response to identifying that the cell is not suitable cell and the UE is the NPN UE.

In an embodiment, the method includes identifying, by the UE, that the UE is a CAG UE. Further, the method includes determining, by the UE, that the cell as not suitable cell in response to identifying the cell as the PLMN cell if the CAG ID is not detected in the acquired SIB1 information. Further, the method includes barring, by the UE, the cell for camping in response to identifying that the cell is not suitable cell and the UE (100) is the CAG UE.

In an embodiment, the method includes determining, by the UE, the CAG ID detected in the acquired SIB1 information is available in the allowed CAG list. Further, the method includes camping, by the UE, on the selected cell.

In an embodiment, the method includes determining, by the UE, the CAG ID detected in the acquired SIB1 information is not available in the allowed CAG list. Further, the method includes baring, by the UE, the selected cell.

In an embodiment, the cell selection is determined by receiving system information comprising a white list of cells for supporting CAG selection, wherein the white list corresponds to list of physical cell identity (PCI) reserved for CAG cells.

Accordingly, the embodiment herein disclose a UE for determining cell suitability for cell selection in a wireless communication system. The UE includes a processor coupled with a memory. The processor is configured to acquire a SIB1 information from a cell when a configuration of a cellBarred bit is notBarred in a MIB. Further, the processor is configured to detect whether one of a NPN ID and a CAG ID is available in the acquired SIB1 information. Further, the processor is configured to perform one of: identify the cell as a NPN cell if the NPN ID is detected in the acquired SIB1 information, identify the cell as a CAG cell if the CAG ID is detected in the acquired SIB1 information, and identify the cell as a Public Land Mobile Network (PLMN) cell if the NPN ID or the CAG ID is not detected in the acquired SIB1 information.

In an embodiment, wherein the processor is configured to: identify that the UE is a NPN UE; determine the cell as a suitable cell in response to identify the cell as the NPN cell if the NPN ID is detected in the acquired SIB1 information; and select the cell for camping in response to identify that the cell is the suitable cell and the UE is the NPN UE.

In an embodiment, wherein the processor is configured to: identify that the UE is a CAG UE; determine the cell as a suitable cell in response to identify that the cell as the CAG cell if the CAG ID is detected in the acquired SIB1 information; and select the cell for camping in response to identify that the cell is the suitable cell and the UE is the CAG UE having the allowed CAG list.

In an embodiment, wherein the processor is configured to: identify that the UE is a non NPN UE or a non CAG UE; determine the cell as a suitable cell in response to identify the cell as the PLMN cell if the NPN ID or CAG ID is not detected in the acquired SIB1 information; and select the cell for camping in response to identify that the cell is the suitable cell and the UE is the non NPN UE or non CAG UE.

In an embodiment, wherein the processor is configured to: identify that the UE is a non NPN UE or a non CAG UE; determine the cell as not suitable cell in response to identify the cell as the NPN cell or the CAG cell if the NPN ID or the CAG ID is detected in the acquired SIB1 information; and bar the cell for camping in response to identify that the cell is not suitable cell and the UE is the non NPN UE or the non CAG UE.

In an embodiment, wherein the processor is configured to: identify that the UE is a NPN UE; determine the cell as not suitable cell in response to identify the cell as the PLMN cell if the NPN ID is not detected in the acquired SIB1; and bar the cell for camping in response to identifying that the cell is not suitable cell and the UE is the NPN UE.

In an embodiment, wherein the processor is configured to: identify that the UE is a CAG UE; determine that the cell as not suitable cell in response to identify the cell as the PLMN cell if the CAG ID is not detected in the acquired SIB1 information; and bar the cell for camping in response to identifying that the cell is not suitable cell and the UE is the CAG UE.

In an embodiment, wherein the processor is configured to: determine that the CAG ID detected in the acquired SIB1 information is available in the allowed CAG list; and camp on the selected cell.

In an embodiment, wherein the processor is configured to: determine that the CAG ID detected in the acquired SIB1 information is not available in the allowed CAG list; and bar the selected cell.

In an embodiment, wherein the cell selection is determined by receiving system information comprising a white list of cells for supporting CAG selection, wherein the white list corresponds to list of physical cell identity (PCI) reserved for CAG cells.

In an embodiment, the method performed by a User equipment (UE) in a wireless communication system is provide. The method comprising: receiving a system information block 1 (SIB 1) which is broadcasted from a base station (BS) of a cell; identifying whether the cell is a Non-Public Network (NPN) cell based on whether information of a NPN is included in the SIB 1, wherein the NPN cell is a cell allowed to be accessed by the UE in the NPN; and accessing the cell, when the cell is identified as the NPN cell.

In an embodiment, the method further comprising: receiving, from the BS in the cell, a Master information block (MIB) including an indicator wherein the indicator indicates whether the cell is barred for the UE; and determining whether the cell is identified as the NPN cell based on the indicator in the MIB.

In an embodiment, wherein the NPN cell is identified based on the information of NPN included in the SIB 1, when the indicator indicates that the cell is not barred for the UE; and wherein the information of NPN includes at least one of a network identifier (NID), a Public Land Mobile Network (PLMN) identifier, or a Closed Access Groups (CAG) identifier.

In an embodiment, wherein the cell is identified as the NPN cell when the NID is matched to information of the NPN which the UE is allowable to access.

In an embodiment, wherein the NPN cell is identified based on the Closed Access Groups (CAG) identifier which is included in the SIB 1.

In an embodiment, wherein the cell is identified as the NPN cell when the CAG ID is matched to a list of the CAG cells which the UE is allowable to access.

In an embodiment, the method further comprising: receiving range of physical cell identity (PCI) values reserved by the NPN for use by CAG cells, and wherein the range of PCI values is broadcasted by the cell.

In an embodiment, the method further comprising: identifying the cell as a barred cell based on the SIB 1, and wherein the SIB 1 does not include information of the NPN.

In an embodiment, wherein the information of the NPN includes at least one of NID or CAG ID.

In an embodiment, wherein the cell is identified as not the NPN cell to access when the indicator indicates the cell is barred for the UE; and wherein the MIB further includes an indicator indicating whether another cell on the same frequency as the barred cell is allowed to access by the UE.

In an embodiment, a user equipment (UE) is provided. The UE comprising: a transceiver; and at least one processor coupled with the transceiver and configured to; control the transceiver to receive a system information block 1 (SIB 1) which is broadcasted from a base station (BS) of a cell, identify whether the cell is a Non-Public Network (NPN) cell based on whether information of a NPN is included in the SIB 1, wherein the NPN cell is a cell allowed to be accessed by the UE in the NPN, and access the cell, when the cell is identified as the NPN cell.

In an embodiment, the at least one processor configured to; control the transceiver to receive, from the BS in the cell, a Master information block (MIB) including an indicator wherein the indicator indicates whether the cell is barred for the UE, and determine whether the cell is identified as the NPN cell based on the indicator in the MIB.

In an embodiment, the at least one processor configured to; identify the NPN cell based on the information of NPN included in the SIB 1, when the indicator indicates that the cell is not barred for the UE; and wherein the information of NPN includes at least one of a network identifier (NID), a Public Land Mobile Network (PLMN) identifier, or a Closed Access Groups (CAG) identifier.

In an embodiment, wherein the cell is identified as the NPN cell when the NID is matched to information of the NPN which the UE is allowable to access.

In an embodiment, the method performed by a Base station (BS) in a wireless communication is provided. the method comprising: broadcasting a system information block 1 (SIB 1) and a Master information block (MIB); and wherein the MIB includes an indicator indicating whether the cell is barred for the UE.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

The embodiments herein achieve a method for determining cell suitability for cell selection in a wireless communication system by a UE. The method includes acquiring, by the UE, a SIB1 information from a cell when a configuration of a cellBarred bit is notBarred in a MIB. Further, the method includes detecting, by the UE, whether one of a NPN ID and a CAG ID is available in the acquired SIB1 information. Further, the method includes performing, by the UE, one of: identifying, by the UE, the cell as a NPN cell if the NPN ID is detected in the acquired SIB1 information, identifying, by the UE, the cell as a CAG cell if the CAG ID is detected in the acquired SIB1 information, and identifying, by the UE, the cell as a PLMN cell if the NPN ID or the CAG ID is not detected in the acquired SIB1 information Various embodiments of the proposed method are adopted in the 3GPP TS 38.300 and 3GPP TS 38.304.

In an embodiment, the NPN UEs camp on the cell which broadcast NID/CAG ID in which the UE is interested i.e. the UE is subscribed to. In another embodiment, if the cell does not broadcast NID/CAG ID or the cell broadcasts NID/CAG ID which the UE is not subscribed to then, the UE does not consider the cell for camping i.e. bar the cell. If the NPN UE considers to bar the cell then the NPN UE also need to be specified how the UE bar all the cells on the same frequency i.e. based on the Rel-15 IFRI bit in MIB.

In the last few decades several broadband wireless technologies have been developed to meet the growing number of broadband subscribers and to provide more and better applications and services. A second generation wireless communication system has been developed to provide voice services while ensuring a mobility of users. A third generation wireless communication system supports not only a voice service but also a data service. In recent years, a fourth generation wireless communication system has been developed to provide high-speed data service. However, currently, the fourth generation wireless communication system suffers from lack of resources to meet the growing demand for high speed data services, so that a fifth generation wireless communication system is being developed to meet the growing demand for high speed data services, support ultra-reliability and low latency applications.

The fifth generation wireless communication system will be deployed not only in lower frequency bands e.g. 500 MHz to 10 GHz bands, but also in higher frequency (mmWave) bands, e.g., 10 GHz to 100 GHz bands, so as to accomplish higher data rates. In order to mitigate propagation loss of the radio waves and increase the transmission distance, beam forming, massive Multiple-Input Multiple-Output (MIMO), Full Dimensional MIMO (FD-MIMO), array antenna, an analog beam forming, large scale antenna techniques are being considered in a design of the fifth generation wireless communication system. In addition, the fifth generation wireless communication system is expected to address different use cases having quite different requirements in terms of data rate, latency, reliability, mobility etc. However, the design of an air-interface of the fifth generation wireless communication system would be flexible enough to serve the UEs having quite different capabilities depending on a use case and market segment a UE cater service to an end customer. Few example use cases are the fifth generation wireless communication system wireless system that is expected to address an enhanced Mobile Broadband (eMBB), massive Machine Type Communication (m-MTC), ultra-reliable low latency communication (URLL) etc. The eMBB requirements like tens of Gbps data rate, low latency, high mobility so on and so forth address the market segment representing conventional wireless broadband subscribers needing internet connectivity everywhere, all the time and on the go.

The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for autonomous cars. The industrial automation also referred as smart factory can be implemented using private network or non-public network.

In the fourth generation wireless communication system like Long-Term Evolution (LTE), enhanced node B (eNB) or base station broadcast a system information in a cell. The system information is structured into master information block (MIB) and a set of system information blocks (SIBs). The MIB consists of System Frame Number (SFN), Downlink System bandwidth and Physical Hybrid Automatic Repeat Request (ARQ) Feedback Indicator Channel (PHICH) configuration. The MIB is transmitted every 40 ms. It is repeated every 10 ms where the first transmission occurs in sub frame #0 when SFN mod 4 equals zero. The MIB is transmitted on the physical broadcast channel (PBCH). System Information Block Type 1 (SIB1) carries cell identity, tracking area code, cell barring information, value tag (common for all scheduling units), and scheduling information of other SIBs. The SIB 1 is transmitted every 80 ms in subframe #5 when SFN mod 8 equals zero. The SIB 1 is repeated in subframe #5 when SFN mod 2 equals zero. The SIB 1 is transmitted on a Physical downlink shared channel (PDSCH). Other SIBs (SIB 2 to SIB 20) are transmitted in System Information (SI) message where the scheduling information of the SIBs are indicated in SIB 1.

In the fifth generation wireless communication system information is divided into minimum SI (MSI) and other SI (OSI). The other SI can be structured into a set of SI-blocks (SIBs).

I. MSI is periodically broadcasted. MSI comprises of NR MIB and NR SIB1. The OSI can be periodically broadcasted or provided on-demand based on a UE request. The MSI comprises basic information required for initial access to the cell and information for acquiring any OSI broadcast periodically or provisioned via an on-demand basis. The NR MIB includes SFN, cell barring information (i.e. cell Barred bit and intrafreqreselection bit), common control resource set (CORESET) which indicates the frequency positions where the UE may find SS/PBCH block with SIB1 or the frequency range where the network does not provide SS/PBCH block with SIB1, physical layer parameters like subcarrier spacing, frequency domain offset between SSB and the overall resource block grid in number of subcarriers and position of first Demodulation Reference Signal (DMRS) for downlink.

II. The NR SIB1 includes list of Public Land Mobile Network (PLMN), Cell identifier (ID), cell camping parameters, Random Access Channel (RACH) parameters. If the fifth generation network allows on demand mechanism, parameters required for requesting other SI-block(s) (if any needed, e.g. RACH preambles for request) are also included in the NR SIB1. The scheduling information in the minimum NR SIB1 includes an indicator which indicates whether the concerned SI-block is periodically broadcasted or provided on demand. The scheduling information for the other SI includes SIB type, validity information (i.e. system information value tag), SI periodicity and SI-window information. The scheduling information for the other SI is provided irrespective of whether the other SI is periodically broadcasted or not. If minimum SI indicates that a SIB is not broadcasted (i.e. it is provided on demand), then the UE does not assume that the SIB is a periodically broadcasted in its SI-window at every SI period. Therefore the UE may send an SI request to receive the SIB. For other SI provided on-demand, the UE can request one or more SI-block(s) or all SI-blocks in a single request. The SIBs of OSI can be indicated either cell-specific SIB or area-specific SIB. If the SIB is cell-specific the UE associates the concerned value tag of the corresponding SIB with the Cell Identity in SIB1 from which the UE acquired the SIB. If the SIB is area-specific the UE associates the concerned value tag of the corresponding SIB with the Area Identity in SIB1 from which the UE acquired the SIB.

In the fifth generation communication system, the 5G Core (5GC) supports a Non-Public Network (NPN) which is considered for non-public use i.e. private use, according to 3GPP TS 22.261. The radio access network (RAN) connected to 5GC can be either LTE RAN or NR RAN. An NPN may be deployed as:
 1. Stand-alone Non-Public Network (SNPN) i.e. operated by an NPN operator and not relying on network functions provided by a PLMN,
 2. Public network integrated NPN, i.e. a non-public network deployed with the support of a PLMN. Hereafter regardless of S-NPN or PLMN integrated NPN, such a network is commonly referred as non-public network (NPN) or private network.

The NPN are expected to deploy NPN cells, also called as CAG (Closed access group) cells over which functionalities specific to NPN can be served to support NPN services of the UE. An example of NPN and NPN service is the fifth generation network deployed in factory environment for automating some of the industrial processes in the factory, such that the NPN could be either standalone NPN (i.e. SNPN) or PLMN integrated NPN (PNPN). Some sensors, actuators and robots in the factory will be equipped with NR radios and the UEs need to access the NPN cells for NPN services. The NPN services may be provisioned for functions such as supervisory control and data acquisition (SCADA) operations in the factory environment. Two types of UEs need to be considered:

I. NPN UEs: These are UEs which either support NPN feature or required to support CAG functionality. These can be either LTE UEs or NR UEs. These type of UEs are further elaborated as follows:
  Only NPN UEs: These UEs can camp only on NPN cells or in other words, the UEs are ONLY interested in NPN service.
  NPN UEs: These UEs can camp on both NPN cells and non NPN cells. In other words when these UEs are camped on NPN cells they normally would request NPN service and when they are camped on non NPN cell they may request normal services II. Non-NPN UEs: These type of UEs are further elaborated as follows:
  Legacy UE: A Release-15 UE which does not understand a cell supporting Closed Access Group (CAG) functionality or legacy UEs that do not understand NPN functionality. These can be either LTE UEs or NR UEs. Basically these UEs cannot understand any new signalling introduced for NPN functionality
  Non-NPN-capable UE: These are not legacy UEs but UEs neither supporting NPN feature nor required to support CAG functionality. It is undesirable for Non-NPN UE to implement functions designed for NPN feature. However, these UEs can differentiate whether the cell supports NPN feature or CAG functionality. These can be either LTE UEs or NR UEs. Basically these UEs can understand new signalling introduced for NPN, but do not support NPN functionality UEs regardless of legacy type or non-NPN type are hereafter generically referred to as non-NPN capable UE's. These non NPN UEs are not expected to camp on NPN or CAG cell.

Three type of cells need to be considered in the context of NPN:
- Normal cells or non NPN cells: These cells provide normal service. These cells do not provide NPN service therefore they do not broadcast NPN information. Legacy UEs, non NPN UEs and NPN UEs can camp on these cells. Only NPN UEs bar the normal cell.
- NPN cells: These cells provide NPN service and therefore they broadcast NPN information. These cells do not provide normal service. NPN UEs and Only NPN UEs can camp on these cells. Legacy UEs and non NPN UEs bar the NPN cell.
- Hybrid cells: These cells provide both normal service as well as NPN service. They broadcast NPN information but also provide non NPN service. All UEs types can camp on Hybrid cells.

The principal need of the embodiments herein is to disclose a method for achieving the desired UE behavior for the only NPN UEs, the NPN UE and the Legacy/Non-NPN UEs for camping on the cell after reading system information broadcast from the cell.

The principal object of the embodiments herein disclose a method and a UE for determining cell suitability for cell selection in a wireless communication system.

Referring now to the drawings, and more particularly to FIGS. 1 through 9, where similar reference characters denote corresponding features consistently throughout the figures, there are shown preferred embodiments.

FIG. 1 illustrates various hardware components of a UE (100) for determining cell suitability for cell selection or cell reselection in a wireless communication system, according to an embodiment as disclosed herein. The UE (100) can be, for example, but not limited to a cellular phone, a smart phone, a Personal Digital Assistant (PDA), a tablet computer, a laptop computer, an Internet of Things (IoT), a virtual reality device, a smart phone, a flexible electronic device, and a foldable electronic device. The UE (100) includes a processor (102), a communicator (104), a memory (106) and a cell suitability determination controller (108). The processor (102) is coupled with the communicator (104), the memory (106) and the cell suitability determination controller (108).

The cell suitability determination controller (108) is configured to detect that the UE (100) is in an IDLE state or an INACTIVE state and acquire a MIB from the cell. Further, the cell suitability determination controller (108) is configured to determine a configuration of a cellBarred bit in the acquired MIB. Further, the cell suitability determination controller (108) is configured to acquire a SIB1 from the cell when the configuration of the cellBarred bit is notBarred in the acquired MIB.

Further, the cell suitability determination controller (108) is configured to detect whether one of a NPN ID and a CAG ID is available in the acquired SIB1 information. Further, the cell suitability determination controller (108) is configured to perform one of identify the cell as a NPN cell if the NPN ID is detected in the acquired SIB1 information, identify the cell as a CAG cell if the CAG ID is detected in the acquired SIB1 information, and identify the cell as a PLMN cell if the NPN ID or the CAG ID is not detected in the acquired SIB1 information.

In an embodiment, the cell suitability determination controller (108) is configured to identify that the UE (100) is a NPN UE. Further, the cell suitability determination controller (108) is configured to determine the cell as a suitable cell in response to identify the cell as the NPN cell if the NPN ID is detected in the acquired SIB1 information. Further, the cell suitability determination controller (108) is configured to select the cell for camping in response to identify that the cell is the suitable cell and the UE (100) is the NPN UE.

In an embodiment, the cell suitability determination controller (108) is configured to identify that the UE (100) is a CAG UE and determine the cell as a suitable cell in response to identify that the cell as the CAG cell if the CAG ID is detected in the acquired SIB1 information. Further, the cell suitability determination controller (108) is configured to select the cell for camping in response to identify that the cell is the suitable cell and the UE (100) is the CAG UE having the allowed CAG list.

In an embodiment, the cell suitability determination controller (108) is configured to determine that the CAG ID detected in the acquired SIB1 information is available in the allowed CAG list and camp on the selected cell.

In an embodiment, the cell suitability determination controller (108) is configured to determine that the CAG ID detected in the acquired SIB1 information is not available in the allowed CAG list and bar the selected cell.

In an embodiment, the cell selection is determined by receiving system information comprising a white list of cells for supporting CAG selection, where the white list corresponds to list of physical cell identity (PCI) reserved for CAG cells.

In an embodiment, the cell suitability determination controller (108) is configured to identify that the UE (100) is a non NPN UE or a non CAG UE. Further, the cell suitability determination controller (108) is configured to determine the cell as a suitable cell in response to identify the cell as the PLMN cell if the NPN ID or CAG ID is not detected in the acquired SIB1 information. Further, the cell suitability determination controller (108) is configured to select the cell for camping in response to identify that the cell is the suitable cell and the UE (100) is the non NPN UE or the non CAG UE.

In an embodiment, the cell suitability determination controller (108) is configured to identify that the UE (100) is a non NPN UE or a non CAG UE. Further, the cell suitability determination controller (108) is configured to determine the cell as not suitable cell in response to identify the cell as the NPN cell or the CAG cell if the NPN ID or the CAG ID is detected in the acquired SIB1 information. Further, the cell suitability determination controller (108) is configured to bar the cell for camping in response to identify that the cell is not suitable cell and the UE (100) is the non NPN UE or the non CAG UE.

In an embodiment, the cell suitability determination controller (108) is configured to identify that the UE (100) is a NPN UE and determine the cell as not suitable cell in response to identify the cell as the PLMN cell if the NPN ID is not detected in the acquired SIB1. Further, the cell suitability determination controller (108) is configured to bar the cell for camping in response to identifying that the cell is not suitable cell and the UE (100) is the NPN UE.

In an embodiment, the cell suitability determination controller (108) is configured to identify that the UE (100) is a CAG UE and determine that the cell as not suitable cell in response to identify the cell as the PLMN cell if the CAG ID is not detected in the acquired SIB1 information. Further, the cell suitability determination controller (108) is configured to bar the cell for camping in response to identifying that the cell is not suitable cell and the UE (100) is the CAG UE.

Further, the following describes the cell access control desired for different UE types on different cell types.

1. Barring bit in MIB is set to "notBarred" if the cell is a normal cell or a hybrid cell. The UE (100) will read SIB1 from such cells.
   a) Only NPN UEs does not find NPN info or SIB-X scheduling info in the SIB1 from the normal cell, so that the only NPN UE bar the cell. The only NPN UE finds the NPN info or SIB-X scheduling info in the SIB1 from the hybrid cell then camp on the cell if NID/CAG ID is in the allowed CAG list stored in the only NPN UE.
      Option 1: the only NPN UEs do not find NPN info or SIB-X scheduling info in the SIB1 from normal cell, so that the only NPN UEs bar the cell,
      Option 2: Only NPN UEs do not find NPN info or SIB-X scheduling info in the SIB1 from the normal cell, so that the only NPN UEs bar the cell as well as this frequency, and
      Option 3: Only NPN UEs do not find NPN info or SIB-X scheduling info in SIB1 from normal cell, if IFRI-NPN bit is set to barred then bar the cell as well as this frequency, if IFRI-NPN bit is set to not barred then bar the cell but not the frequency.
   b) NPN UEs do not find NPN info or SIB-X scheduling info in the SIB1 from the normal cell, but can access the cell for normal service. For an idle/inactive mode load balancing purpose it may be required to bar NPN UEs from camping on normal cell then NPN specific barring bit need to be introduced in the SIB1. The NPN UE find NPN info or SIB-X scheduling info in SIB1 from the hybrid cell then camp on the cell if NID/CAG ID is in the allowed NID/CAG ID list stored in the NPN UEs
   c) Legacy UEs and non NPN UEs can camp on normal cells as long as a suitability or re-selection criterion is met. The legacy UEs and non NPN UEs can camp on the hybrid cells as long as a suitability or re-selection criterion is met. The NPN info or SIB-X scheduling info in SIB1 broadcasted by the Hybrid cells is ignored by legacy UEs and non NPN UEs
2. Barring bit in MIB is set to "Barred" if the cell is NPN cell. The legacy UEs and non NPN UEs bar the cell while NPN/only NPN UEs ignore the barring bit and read SIB1:
   a) NPN UEs find NPN info or SIB-X scheduling info in SIB1 from NPN cell then camp on the cell if NID/CAG ID is in the allowed list stored in the UE (100).
   b) Only NPN UEs find NPN info or SIB-X scheduling info in SIB1 from NPN cell then camp on the cell if NID/CAG ID in the allowed list stored in the UE (100).

Figure 3A:
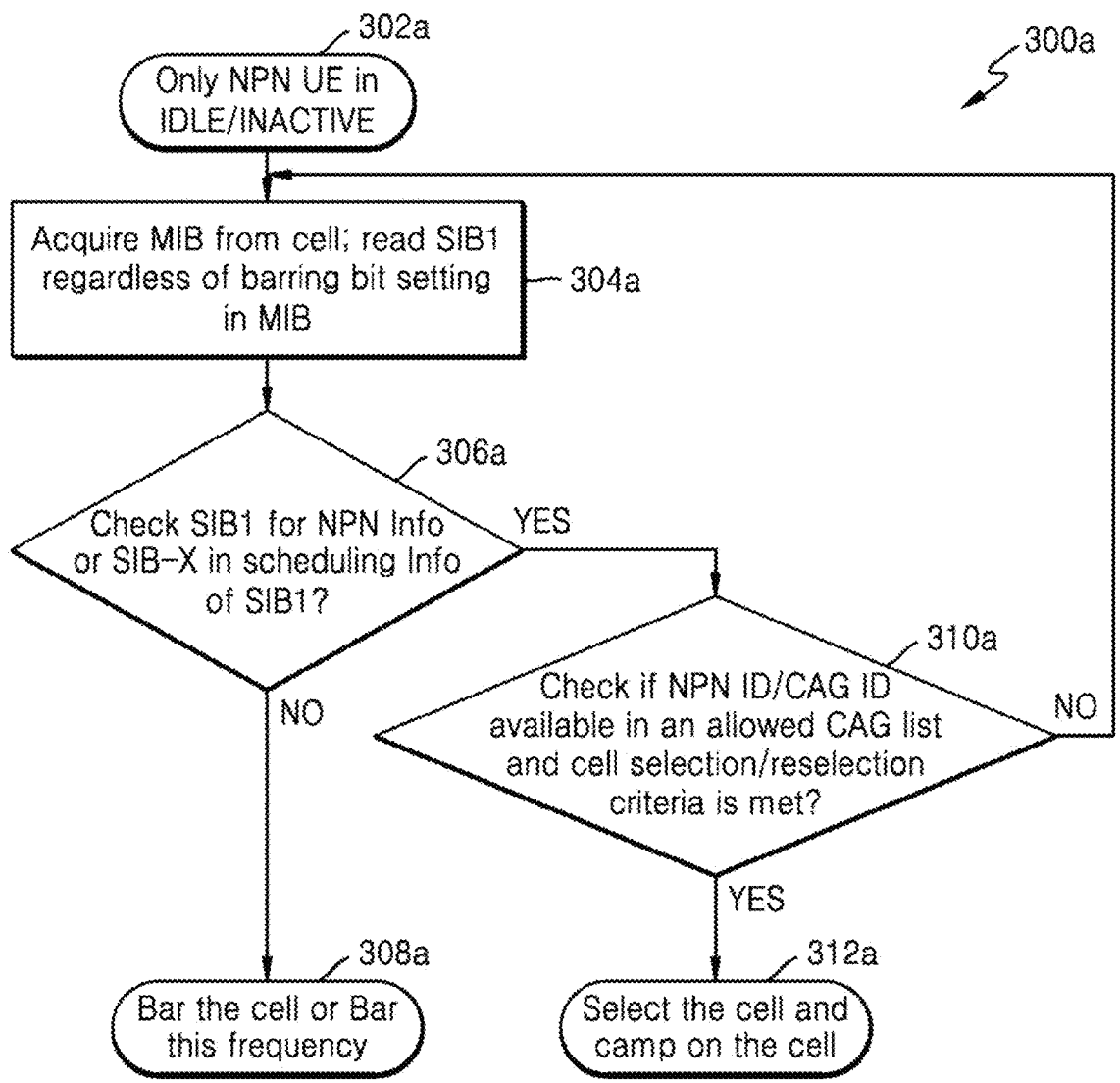
FIG. 3A is a flow chart illustrating an only NPN UE behavior when the cell is a NR cell, according to embodiments as disclosed herein.
Figure 3B:
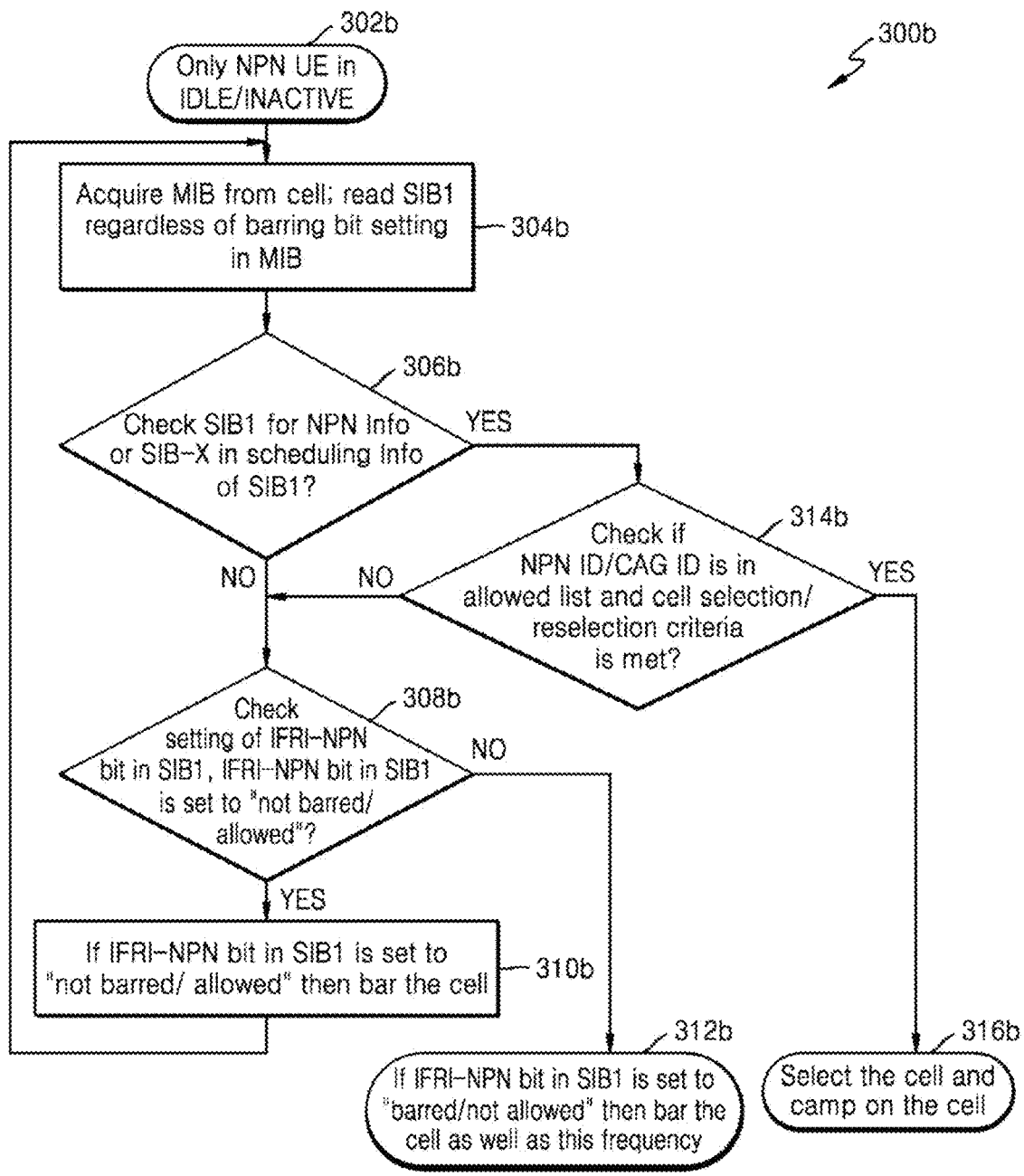
FIG. 3B is another flow chart illustrating the only NPN UE behavior when the cell is the NR cell, according to embodiments as disclosed herein.
Figure 3C:
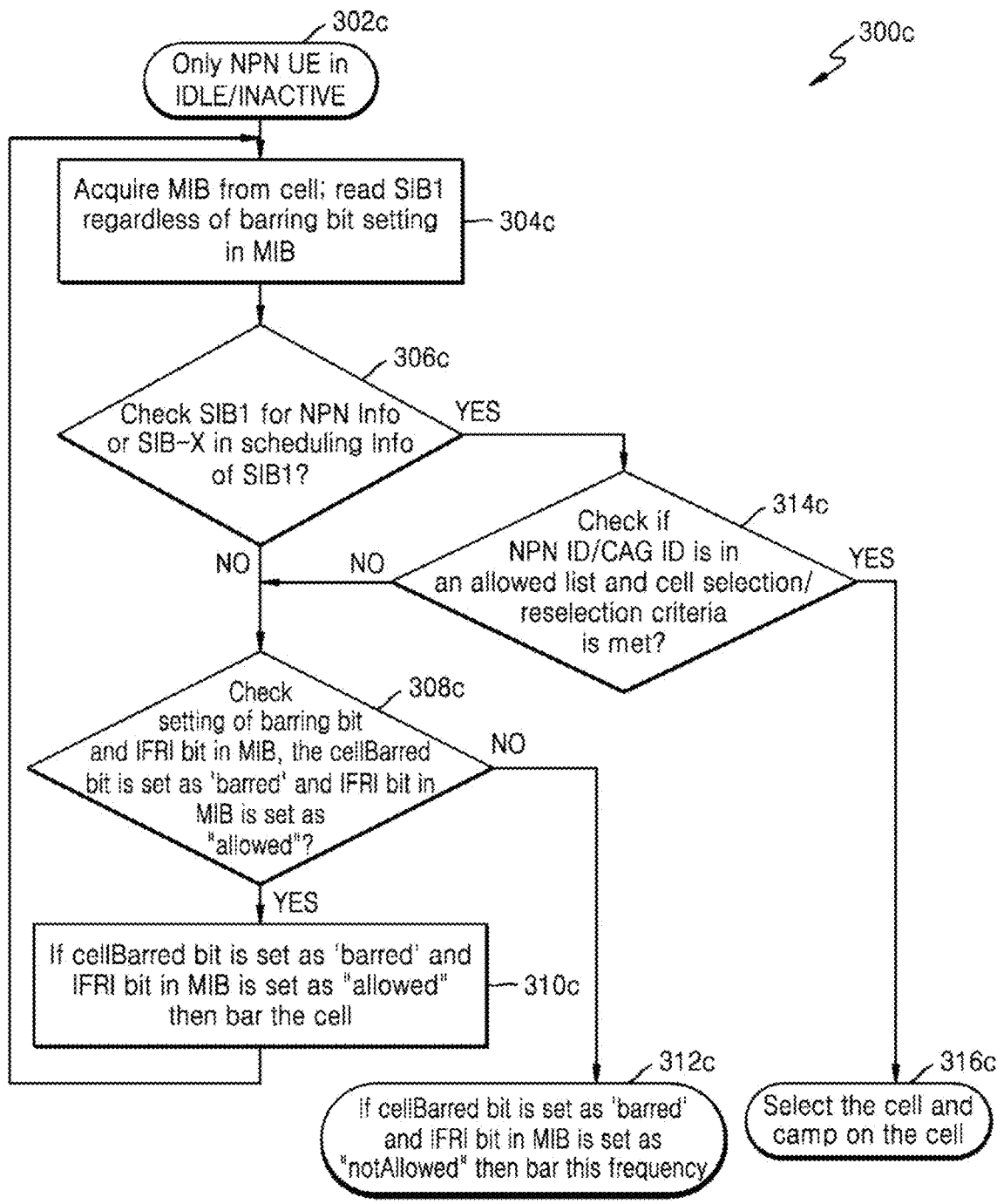
FIG. 3C is another flow chart illustrating the only NPN UE behavior when the cell is the NR cell, according to embodiments as disclosed herein.

UE behaviour of Only NPN UEs: Following UE behavior is desired for the only NPN UEs when the UE (100) reads broadcast of MSI from NR cell.
   A. Only NPN UEs always read NR MIB and NR SIB1 i.e. ignores the setting of cellBarred bit in NR MIB for reading NR SIB1.
   B. If Only NPN UEs find NPN information in NR SIB1 or scheduling information in NR SIB1 associated with SIB-X comprising NPN information, then the UE camp on the cell if NPN ID/CAG ID matches (NPN ID/CAG ID in which UE is interested is included in received NPN information) and the cell meet selection/re-selection criteria;
   C. Else Only NPN UEs does not find NPN information in NR SIB1 or SIB-X scheduling information in NR SIB1:
      Option 1: bar the cell as shown in FIG. 3a;
      Option 2: bar the cell as well as this frequency as shown in FIG. 3a.
      Option 3: if intrafreqreselection-NPN i.e. IFRI-NPN bit in NR SIB1 is set to "barred/not allowed" then bar the cell as well as this frequency, if IFRI-NPN bit is set to "notBarred/allowed" then bar the cell but not the frequency as shown in FIG. 3B.
      Option 4: follow barring bit i.e. cellBarred bit and intrafreqreselection bit i.e. IFRI bit in NR MIB as shown in FIG. 3C. If barring bit is set to barred and intrafregreselection bit is set to "barred/not allowed" then bar the cell as well as this frequency. If barring bit is set to barred and intrafregreselection bit is set to "notbarred/allowed" then bar the cell but not the frequency.

Figure 4A:
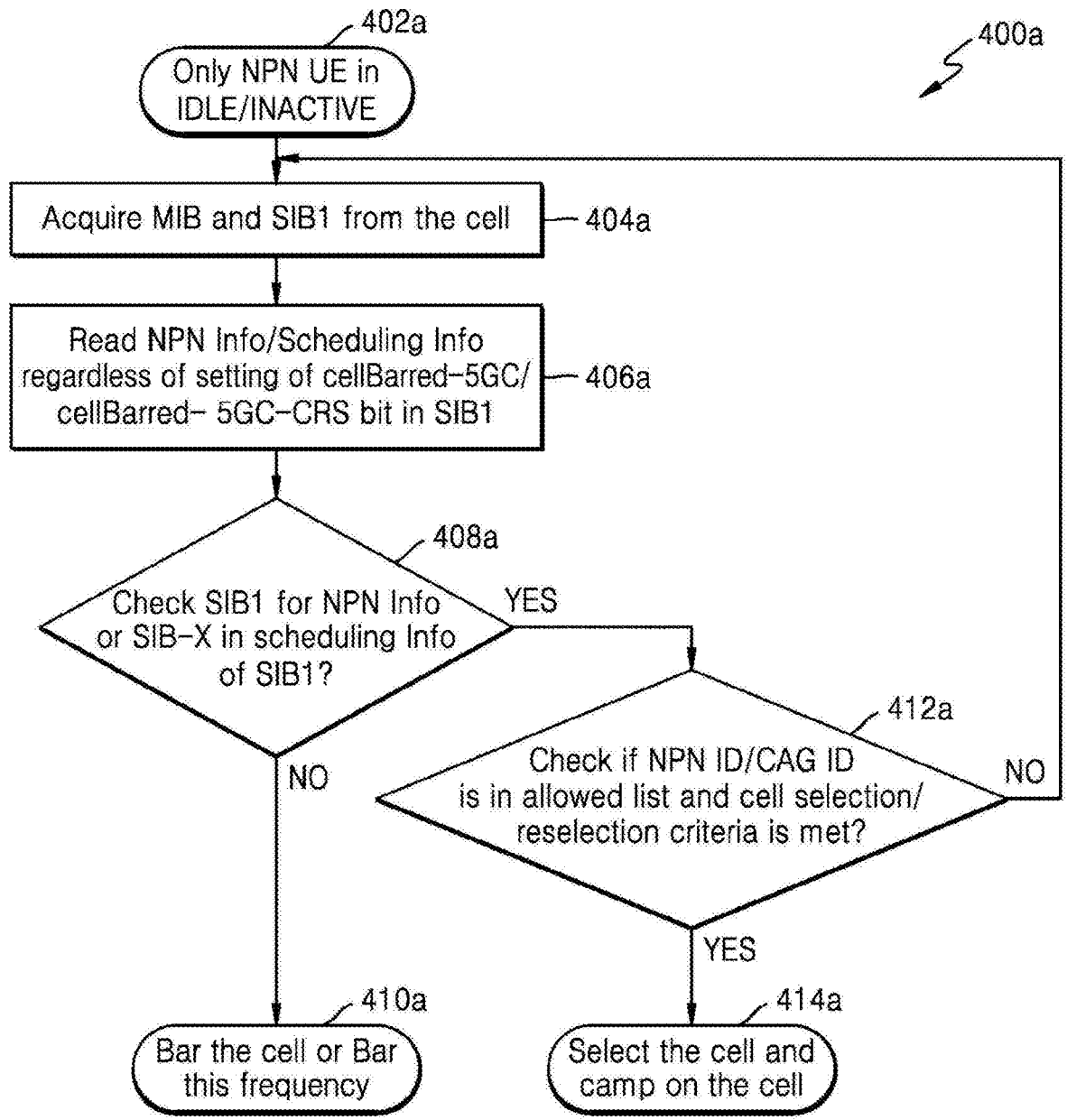
FIG. 4A is a flow chart illustrating the only NPN UE behavior when the cell is a LTE, according to embodiments as disclosed herein.
Figure 4B:
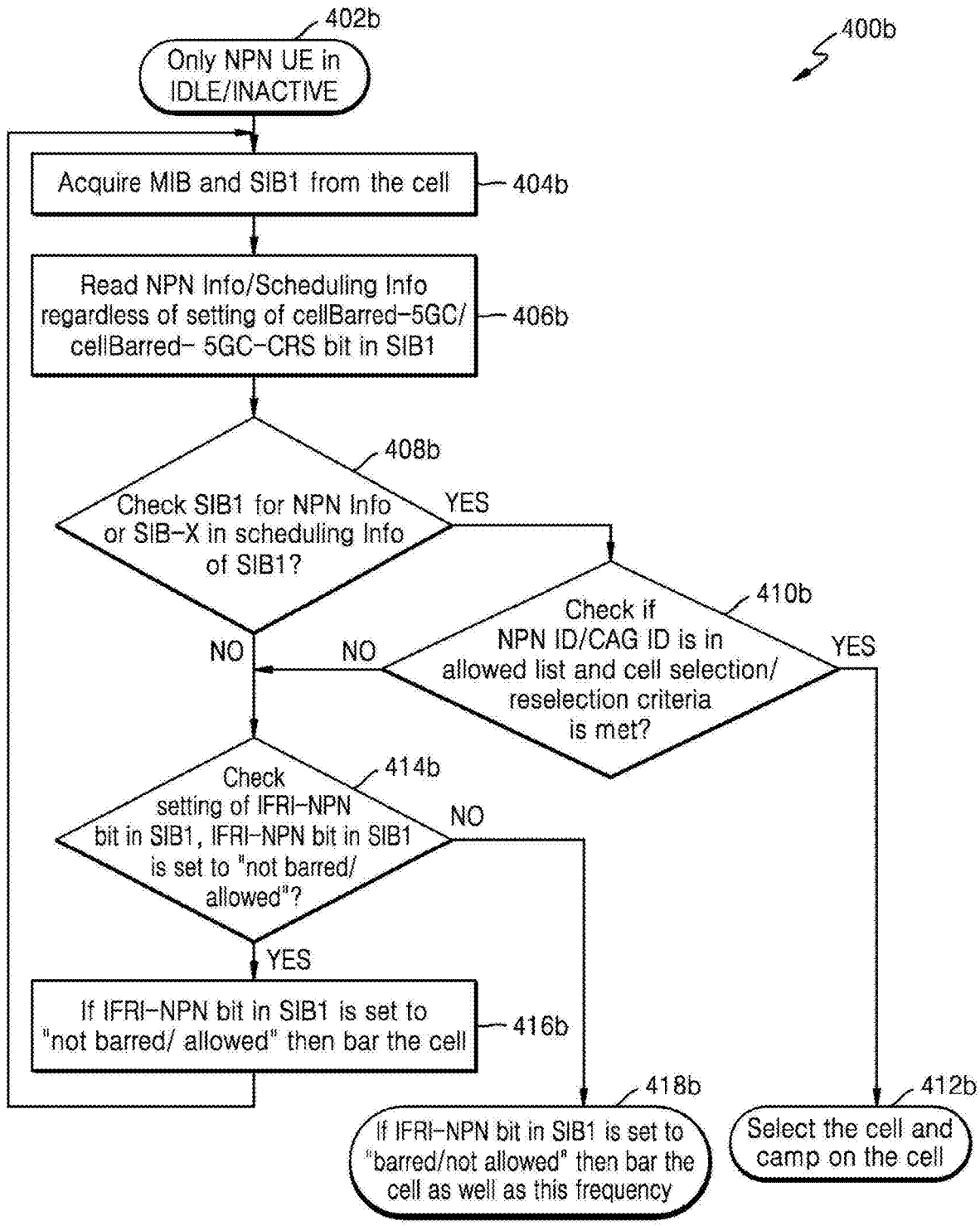
FIG. 4B is another flow chart illustrating the only NPN UE behavior when the cell is the LTE cell, according to embodiments as disclosed herein.
Figure 4C:
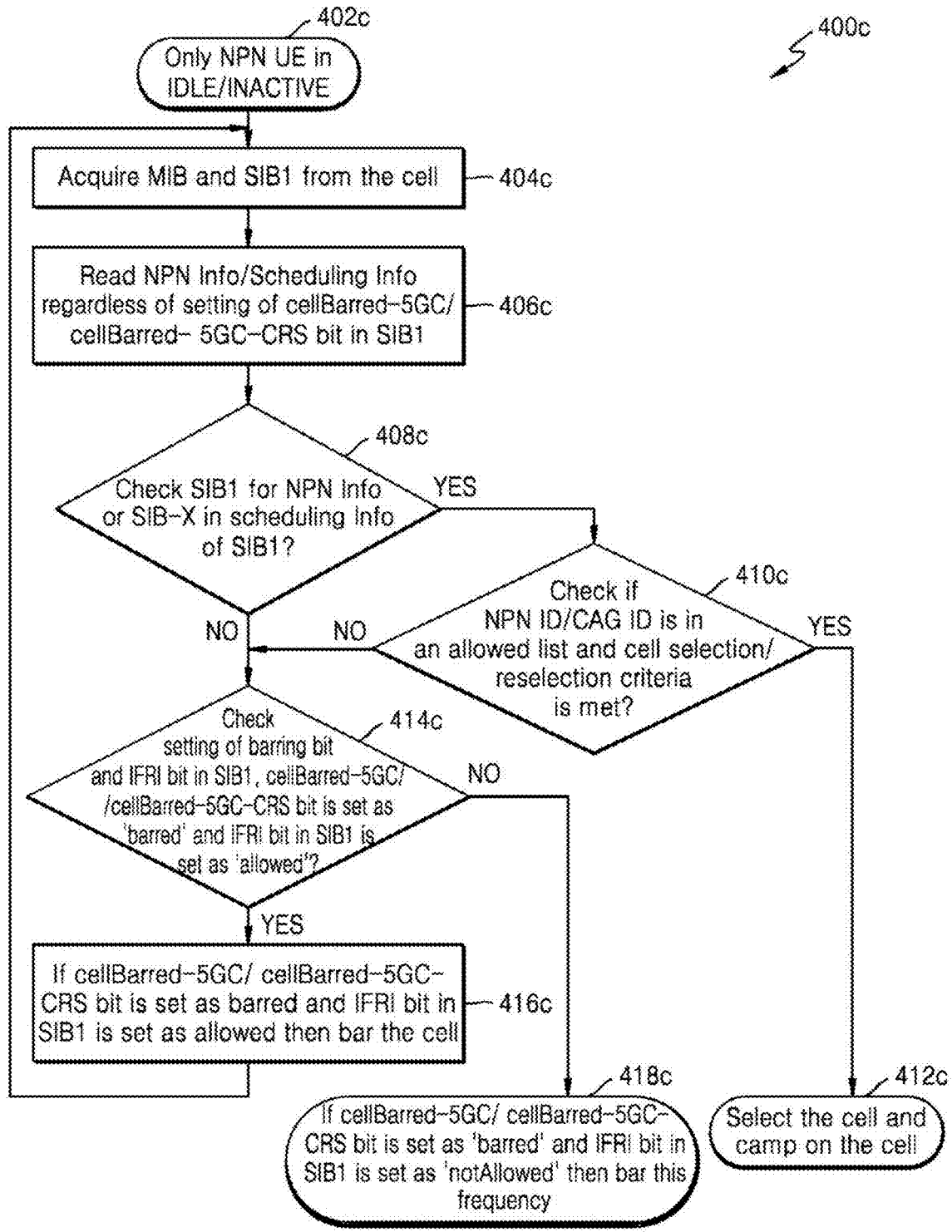
FIG. 4C is another flow chart illustrating the only NPN UE behavior when the cell is the LTE cell, according to embodiments as disclosed herein.

Following UE behavior is desired for the Only NPN UEs, when the UE (100) reads LTE MIB and LTE SIB1 from LTE cell.
   A. "Only NPN UEs" always read LTE MIB and LTE SIB1.
   B. Only NPN UEs ignores the setting of cellBarred-5GC/cellBarred-5GC-CRSbit in LTE SIB1 for reading NPN information.
   C. If "Only NPN UEs" find NPN information in LTE SIB1 or scheduling information in LTE SIB1 associated with SIB-X comprising NPN information, then the UE camp on the cell if NPN ID/CAG ID (NPN ID/CAG ID in which UE is interested is included in received NPN information) matches and the cell meet selection/re-selection criteria.
   D. Else "Only NPN UEs" does not find NPN information in LTE SIB1 or SIB-X scheduling information in LTE SIB1:
      a. Option 1: bar the cell as shown in FIG. 4a;
      b. Option 2: bar the cell as well as this frequency as shown in FIG. 4a;
      c. Option 3: if intrafreqreselection-NPN i.e. IFRI-NPN bit in LTE SIB1 is set to "barred/not allowed" then bar the cell as well as this frequency, if IFRI-NPN bit is set to "not barred/allowed" then bar the cell but not the frequency as shown in FIG. 4B;
      d. Option 4: follow barring bit i.e. cellBarred-5GC/cellBarred-5GC-CRSbit and intrafregreselection-5GC bit i.e. IFRI bit in LTE SIB1 as shown in FIG. 4c.

Figure 5A:
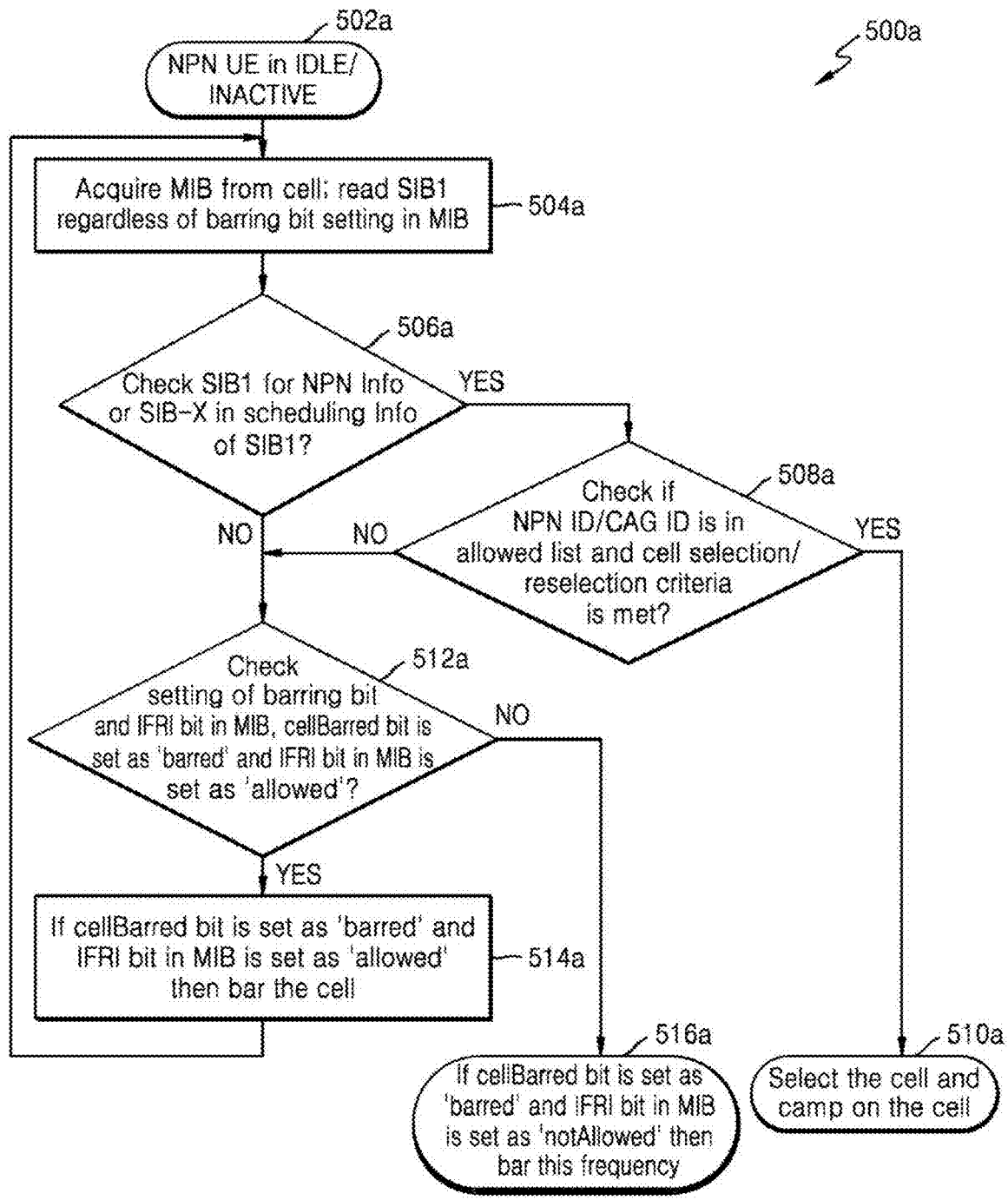
FIG. 5A is a flow chart illustrating a NPN UE behavior when the cell is the NR cell, according to embodiments as disclosed herein.
Figure 5B:
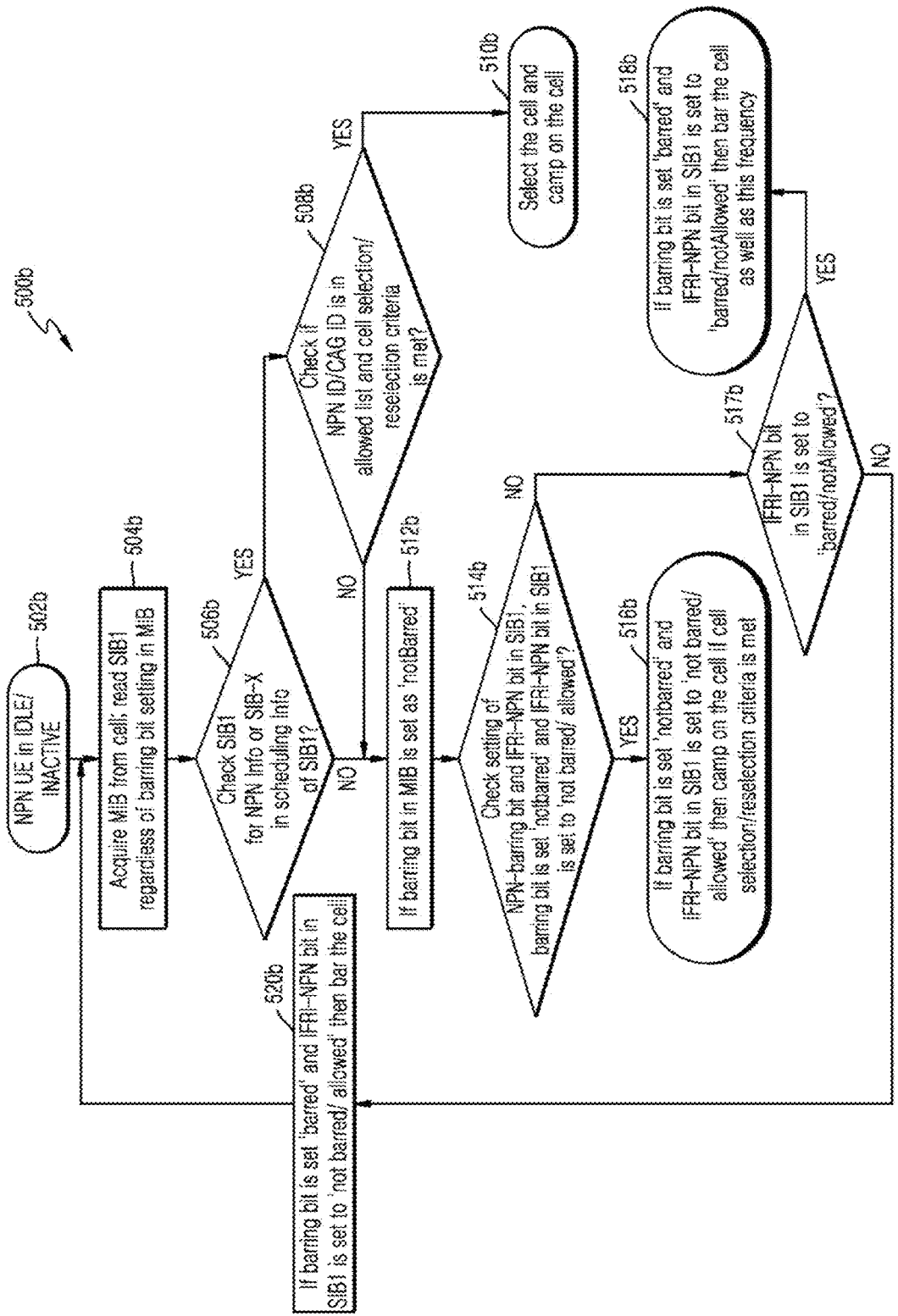
FIG. 5B is another flow chart illustrating the NPN UE behavior when the cell is the NR cell, according to embodiments as disclosed herein.
Figure 5C:
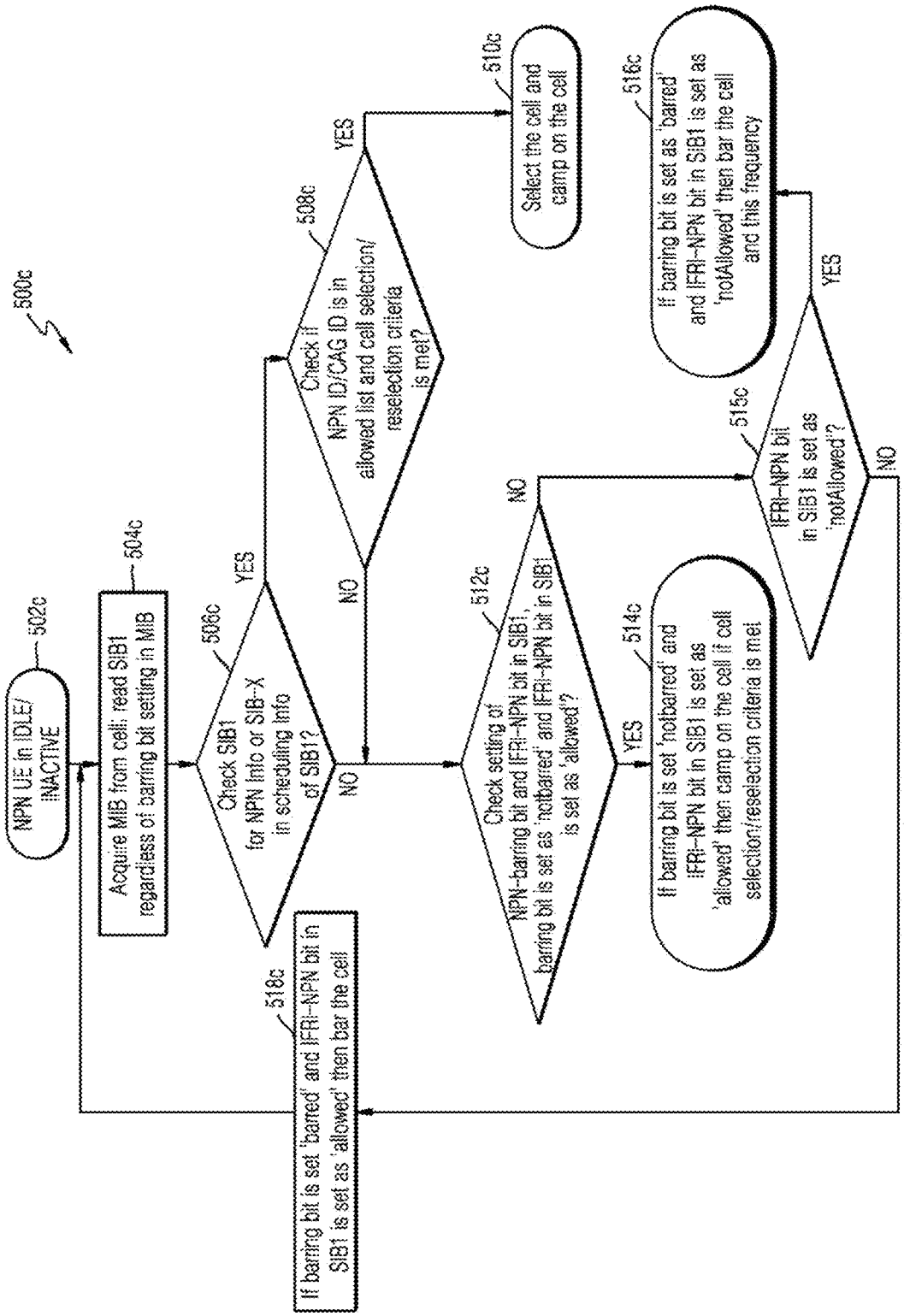
FIG. 5C is another flow chart illustrating the NPN UE behavior when the cell is the NR cell, according to embodiments as disclosed herein.

UE behaviour of NPN UEs: Following UE behavior is desired for "NPN UEs" when the UE reads broadcast of MSI from NR cell.
   1. "NPN UEs" always read NR MIB and NR SIB1 i.e. ignores the setting of cellBarred bit in NR MIB for reading NR SIB1.
   2. If "NPN UEs" find NPN information in NR SIB1 or scheduling information in NR SIB1 associated with SIB-X comprising NPN information, then camp on the cell if NPN ID/CAG ID matches (NPN ID/CAG ID in which UE is interested is included in received NPN information) and the cell meet selection/re-selection criteria.
   3. Else "NPN UEs" does not find NPN information in NR SIB1 or SIB-X scheduling information in NR SIB1:
      Option 1: Follow barring bit i.e. cellBarred bit and intrafreqreselection bit i.e. IFRI bit in NR MIB as shown in FIG. 5a:
      a. if barring bit in MIB is set to 'barred' and IFRI bit is set 'allowed' then bar the cell;
      b. else barring bit in MIB is set to 'barred' and IFRI bit is set 'not allowed' then bar this frequency;
      Option 2: If barring bit in MIB is set to 'notBarred' as shown in FIG. 5b:

a. If NPN-barring bit in NR SIB1 is set to 'barred' and IFRI-NPN bit in NR SIB1 set to 'allowed' then bar the cell;
b. Else if NPN-barring bit in NR SIB1 is set to 'barred' and IFRI-NPN bit in NR SIB1 set to 'not allowed' then bar this frequency; and
c. else camp on the cell for normal service if NPN-barring is not included or set to 'notBarred' and IFRI-NPN bit is set 'allowed' or not included and the cell meet selection/re-selection criteria.
  Option 3: Ignore the barring bit and IFRI bit in NR MIB as shown in FIG. 5c
I. follow NPN-barring/NPN-IFRI bit in NR SIB 1:
a. If NPN-barring bit in NR SIB1 is set to 'barred' and IFRI-NPN bit in NR SIB1 set to 'allowed' then bar the cell;
b. Else if NPN-barring bit in NR SIB1 is set to 'barred' and IFRI-NPN bit in NR SIB1 set to 'not allowed' then bar this frequency; and
c. else camp on the cell for normal service if NPN-barring is not included or set to 'notBarred' and IFRI-NPN bit is set 'allowed' or not included and the cell meet selection/re-selection criteria.

Figure 6A:
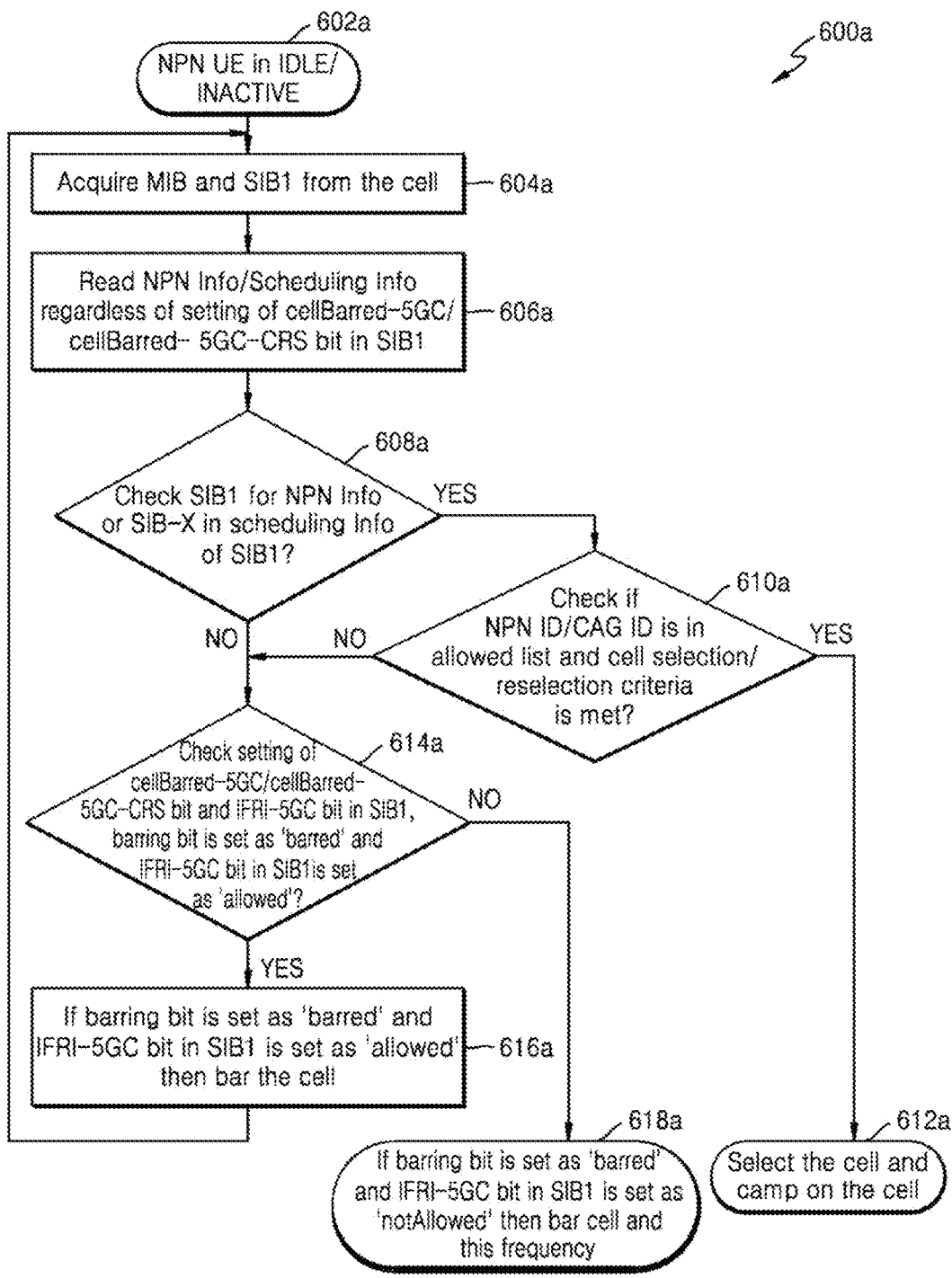
FIG. 6A is a flow chart illustrating the NPN UE behavior when the cell is the LTE cell, according to embodiments as disclosed herein.
Figure 6B:
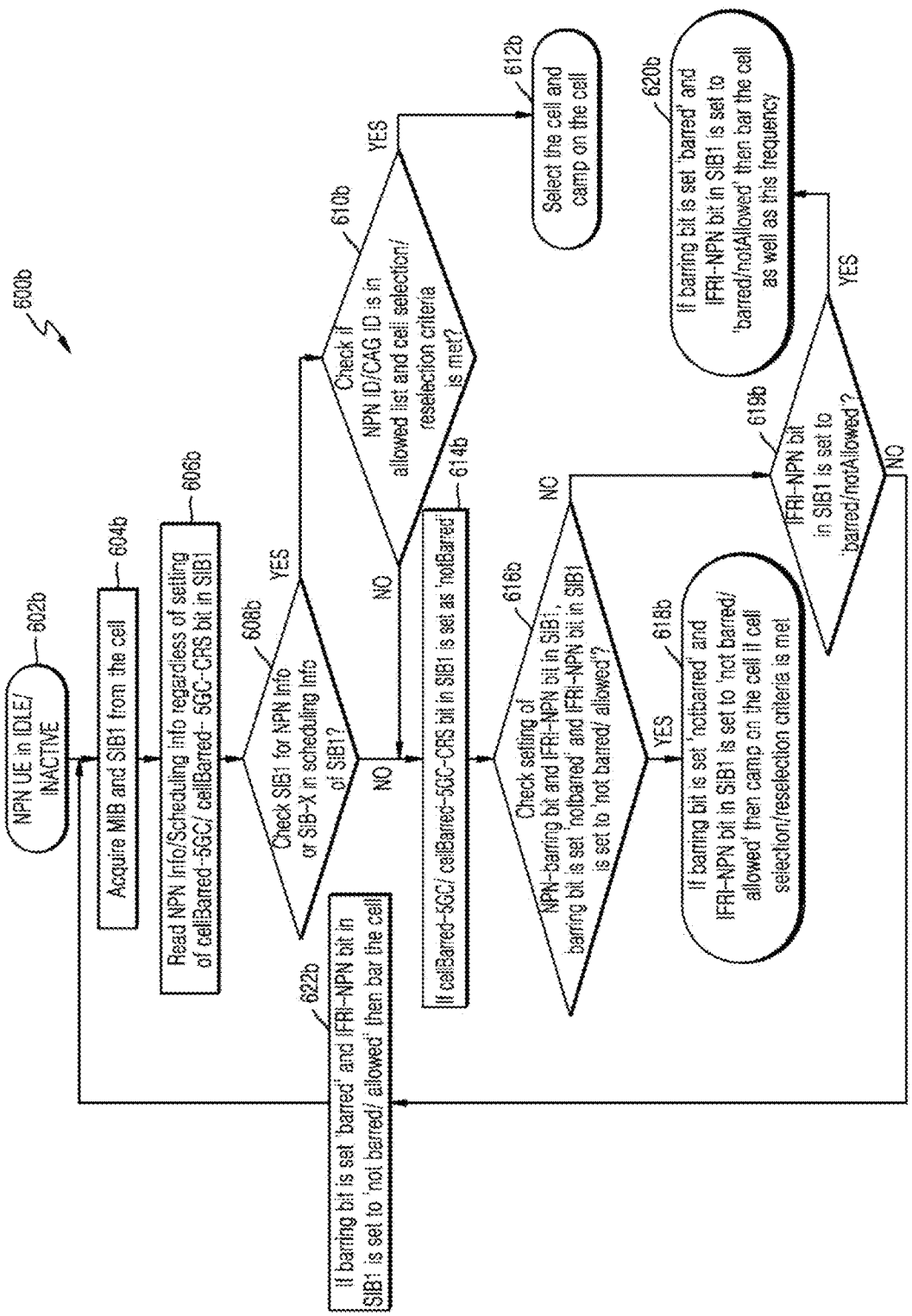
FIG. 6B is another flow chart illustrating the NPN UE behavior when the cell is the LTE cell, according to embodiments as disclosed herein.
Figure 6C:
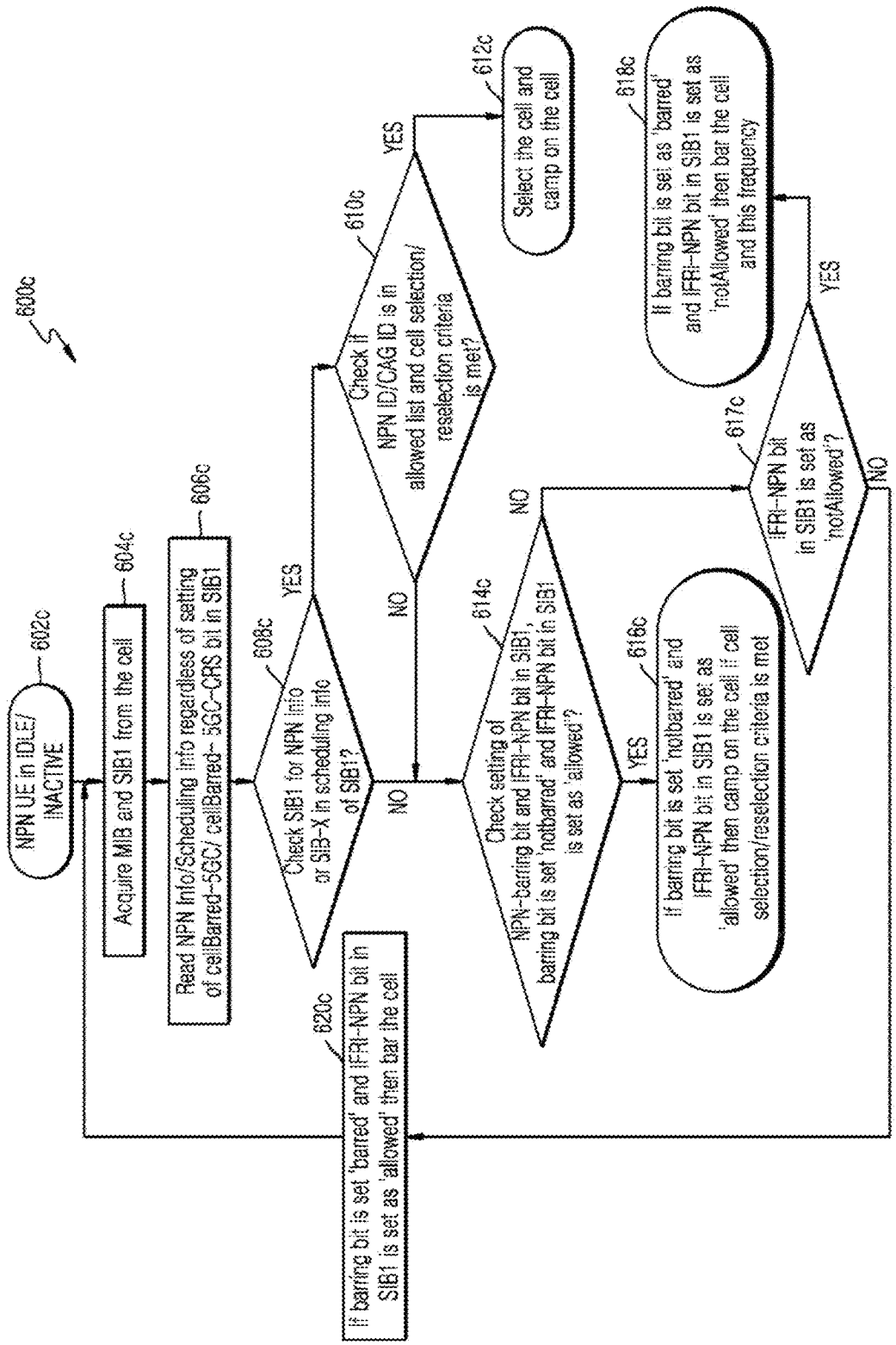
FIG. 6C is another flow chart illustrating the NPN UE behavior when the cell is the LTE cell, according to embodiments as disclosed herein.

Following UE behavior is desired for "NPN UEs" when the UE reads LTE MIB and LTE SIB1 from LTE cell.
  "NPN UEs" always read LTE MIB and LTE SIB1.
  If "NPN UEs" find NPN information in LTE SIB1 or scheduling information in LTE SIB1 associated with SIB-X comprising NPN information, then camp on the cell if NPN ID/CAG ID matches (NPN ID/CAG ID in which UE is interested is included in received NPN information) and the cell meet selection/re-selection criteria;
  Else "NPN UEs" does not find NPN information in LTE SIB1 or SIB-X scheduling information in LTE SIB1:
  1. Option 1: follow barring bit i.e. cellBarred-5GC/cellBarred-5GC-CRSbit and intrafregreselection-5GC bit i.e. IFRI-5GC bit in LTE SIB1 as shown in FIG. 6a:
  a. if barring bit in LTE SIB1 is set to 'barred' and IFRI bit is set 'allowed' then bar the cell; and
  b. else barring bit in LTE SIB1 is set to 'barred' and IFRI bit is set 'not allowed' then bar this frequency.
  2. Option 2: if barring bit in LTE SIB1 is set to 'notBarred' as shown in FIG. 6b:
  a. If NPN-barring bit in LTE SIB1 is set to 'barred' and IFRI-NPN bit in LTE SIB1 set to 'allowed' then bar the cell;
  b. Else if NPN-barring bit in LTE SIB1 is set to 'barred' and IFRI-NPN bit in LTE SIB1 set to 'not allowed' then bar this frequency; and
  c. else camp on the cell for normal service if NPN-barring is not included or set to 'notBarred' and IFRI-NPN bit is set 'allowed' or not included and the cell meet selection/re-selection criteria.
  3. Option 3: Ignore the barring bit and IFRI bit in LTE SIB1 as shown in FIG. 6c
I. follow NPN-barring/NPN-IFRI bit in LTE SIB1:
a. If NPN-barring bit in LTE SIB1 is set to 'barred' and IFRI-NPN bit in LTE SIB1 set to 'allowed' then bar the cell;
b. Else if NPN-barring bit in LTE SIB1 is set to 'barred' and IFRI-NPN bit in LTE SIB1 set to 'not allowed' then bar this frequency; and
c. else camp on the cell for normal service if NPN-barring is not included or set to 'notBarred' and IFRI-NPN bit is set 'allowed' or not included and the cell meet selection/re-selection criteria.

Figure 7A:
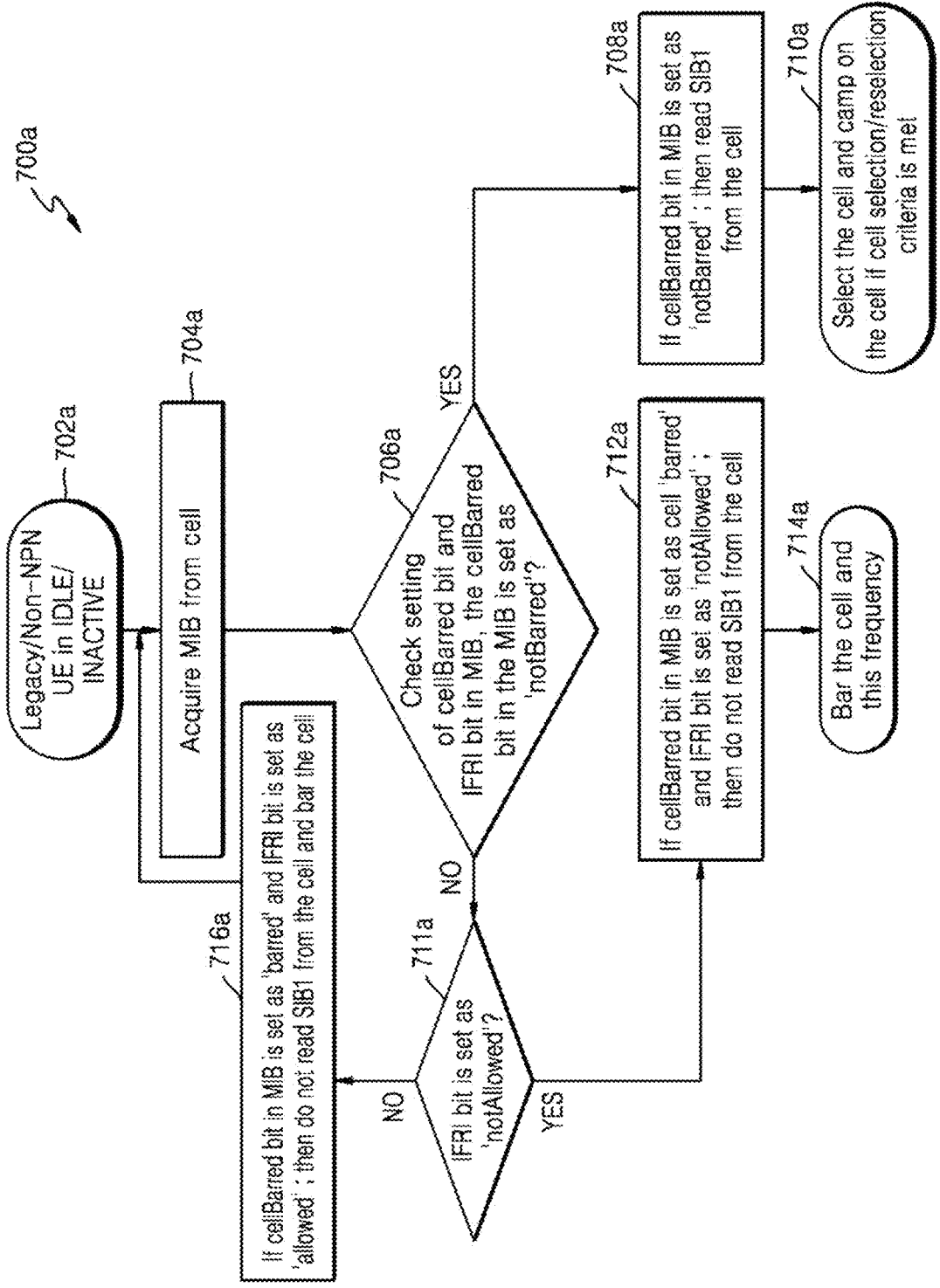
FIG. 7A is a flow chart illustrating a legacy/Non-NPN UE behavior when the cell is the NR cell, according to embodiments as disclosed herein.
Figure 7B:
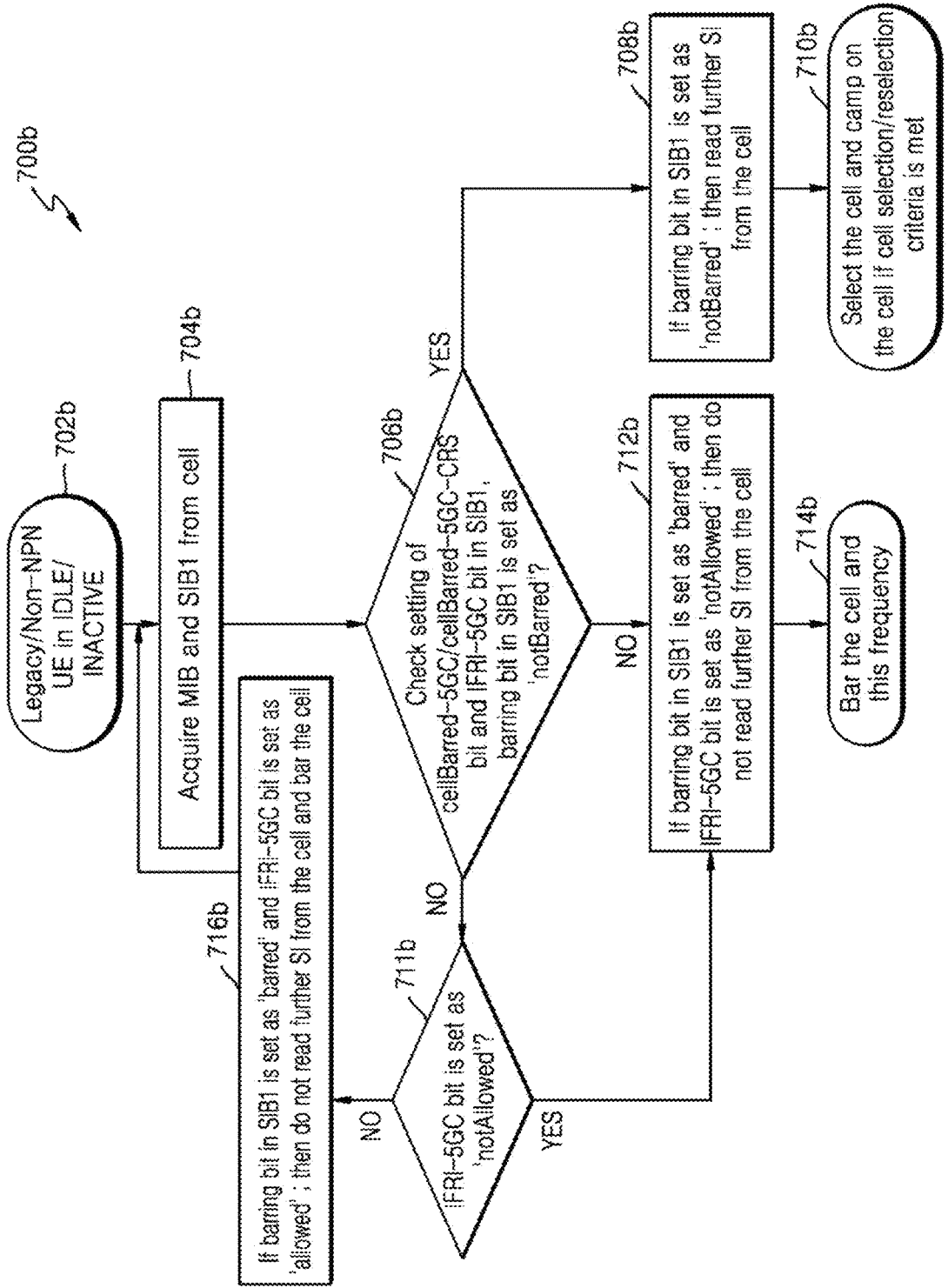
FIG. 7B is another flow chart illustrating the legacy/Non-NPN UE behavior when the cell is the LTE cell, according to embodiments as disclosed herein.

Legacy UEs/Non NPN UEs:
  Following UE behavior is desired for "Legacy/Non NPN UEs" when the UE reads NR MIB from NR cell.
  "Legacy/Non NPN UEs" always read NR MIB broadcasted by NR cell as shown in FIG. 7a:
  1. if barring bit in NR MIB is set to 'notBarred' then read NR SIB1 and camp on the cell if it meets selection/re-selection criteria;
  2. Else follow barring bit and IFRI bit in MIB for barring operation:
  a. if barring bit set to 'barred' and IFRI bit set to 'allowed' then bar the cell; and
  b. else barring bit set to 'barred' and IFRI bit set to 'not allowed' then bar this frequency
  Following UE behavior is desired for "Legacy/Non NPN UEs" when the UE reads LTE MIB and LTE SIB1 from LTE cell.
  "Legacy/Non NPN UEs" always read LTE MIB and LTE SIB1 broadcasted by LTE cell as shown in FIG. 7b:
  1. if barring bit i.e. cellBarred-5GC/cellBarred-5GC-CRSin LTE SIB1 is set to 'notBarred' then camp on the cell if it meets selection/re-selection criteria;
  2. Else follow barring bit i.e. cellBarred-5GC/cellBarred-5GC-CRSand IFRI-5GC bit in LTE SIB1 for barring operation:
  a. if barring bit set to 'barred' and IFRI bit set to 'allowed' then bar the cell; and
  b. Else barring bit set to 'barred' and IFRI bit set to 'not allowed' then bar this frequency.

The NPN capable UE determines whether the cell supports standalone NPN (SNPN) functionality by checking a MCC part of the PLMN ID. If the MCC is 999 then the NPN capable UE determines the cell as part of private network or standalone NPN i.e. SNPN. However, the CAG functionality is supported with non-standalone NPN or PLMN integrated NPN (PNPN) i.e. NPN deployed as part of a PLMN in which case the MCC part of the PLMN ID is not 999 but the normal country code. In such scenario, the "Only NPN UEs" and "NPN UEs" determines that the cell is part of a non-standalone NPN i.e. PNPN if the SIB-1 broadcast or SIB-X includes one or more NPN IDs or CAG IDs. In addition, human-readable network name per NPN-ID or CAG-ID can also be broadcasted in SIB-1 or SIB-X. The SIB-X comprising NPN information may be categorized as on-demand SI, wherein the SIB-X can be cell-specific or area-specific depending on the use case. There is no special handling for on-demand SI request for SIB-X.

In an embodiment, the SIB-X is always broadcasted i.e. not subjected to on-demand provisioning. In an embodiment, SI transmitted in cell can broadcast NPN information of neighboring frequencies. In an embodiment, SI transmitted in cell can provide a white list of cells which supports NPN. A range of Physical Cell ID (PCI) values reserved by the network for use by CAG cells may be broadcast.

The processor (102) is configured to execute instructions stored in the memory (106) and to perform various processes. The communicator (104) is configured for communicating internally between internal hardware components and with external devices via one or more networks.

The memory (106) also stores instructions to be executed by the processor (102). The memory (106) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (106) may, in some examples, be considered a non-transitory storage medium. The term "non-transitory" may indicate that the storage medium is not embodied in a carrier wave or a propagated signal. However, the term "non-transitory" should not be interpreted that the memory (106) is non-movable. In some examples, the memory (106) can be configured to store larger amounts of information than the memory. In certain examples, a non-transitory storage medium may store data that can, over time, change (e.g., in Random Access Memory (RAM) or cache).

Although the FIG. 1 shows various hardware components of the UE (100) but it is to be understood that other embodiments are not limited thereon. In other embodiments, the UE (100) may include less or more number of components. Further, the labels or names of the components are used only for illustrative purpose and does not limit the scope of the disclosure. One or more components can be combined together to perform same or substantially similar function to camp on the private network cell in a wireless communication system.

FIGS. 2A to 2G is a flow chart (200) illustrating a method for determining cell suitability for cell selection or cell reselection in the wireless communication system. The operations (202-258) are performed by the processor (102).

Figure 2A:
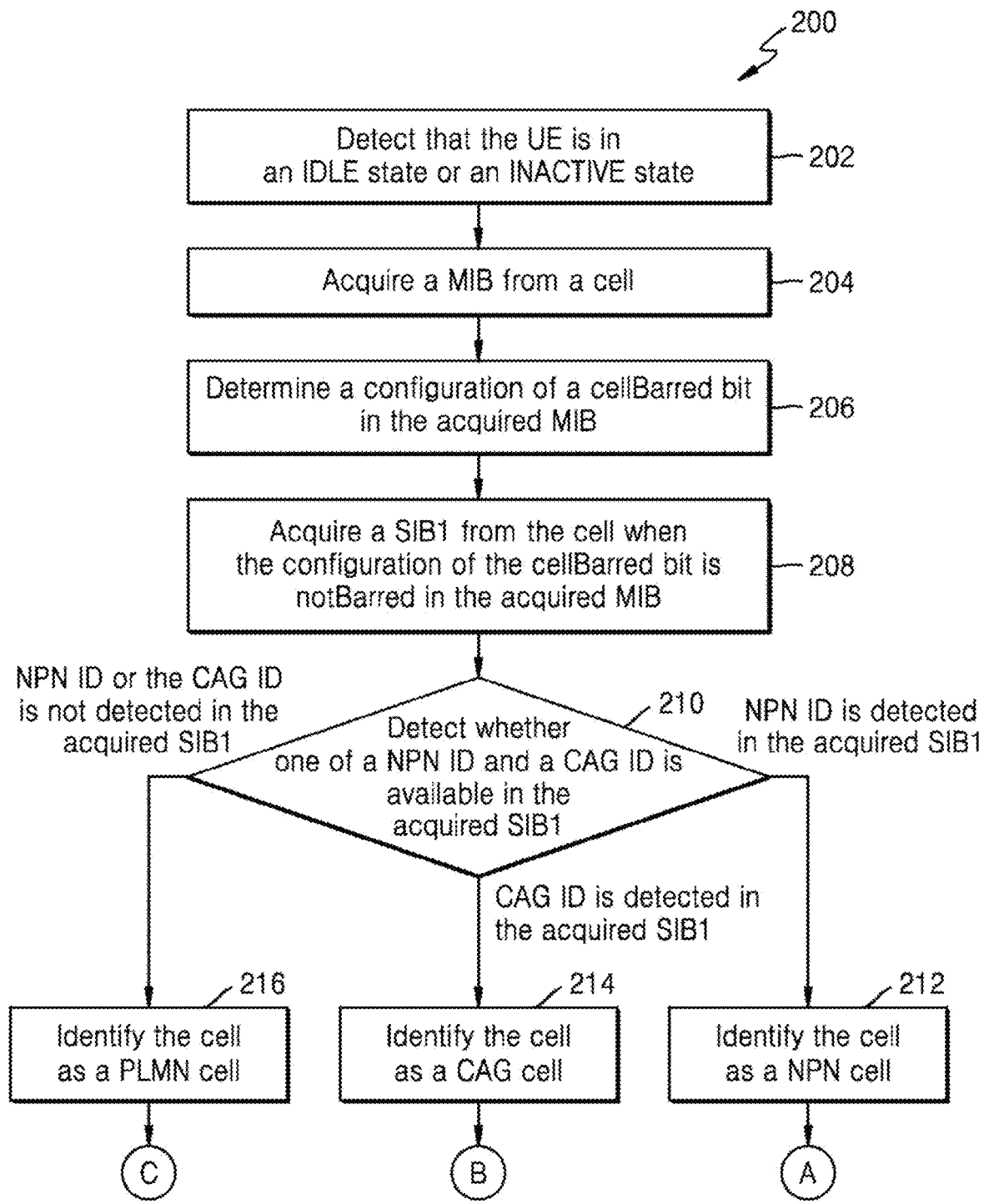

At 202, described in the FIG. 2A, the method includes detecting that the UE (100) is in the IDLE state or the INACTIVE state. At 204, the method includes acquiring the MIB from the cell. At 206, the method includes determining a configuration of a cellBarred bit in the acquired MIB. At 208, the method includes acquiring the SIB1 from the cell when the configuration of the cellBarred bit is notBarred in the acquired MIB. At 210, the method includes detecting whether one of the NPN ID and the CAG ID is available in the acquired SIB1.

If the NPN ID is detected in the acquired SIB1 then, at 212, the method includes identifying the cell as the NPN cell. If the CAG ID is detected in the acquired SIB1 then, at 214, the method includes identifying the cell as the CAG cell. If the NPN ID or the CAG ID is not detected in the acquired SIB1 then, at 216, the method includes identifying the cell as the PLMN cell.

Figure 2B:
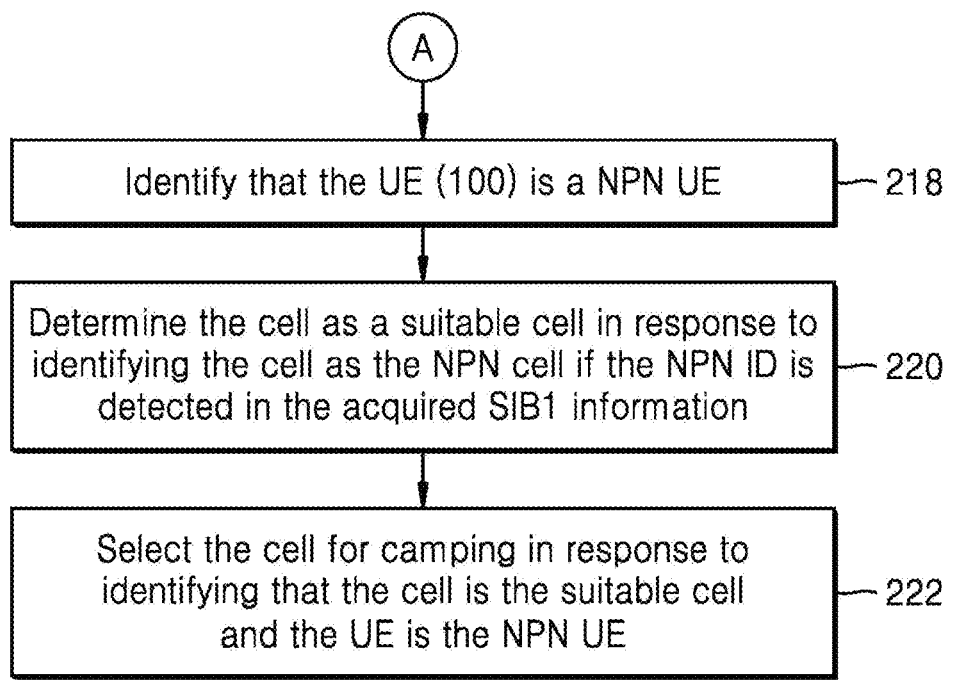

FIG. 2B illustrates method for determining cell suitability for cell selection or cell reselection when the cell may be identified as the NPN cell at 212 of the FIG. 2A. At 218, the method includes identifying that the UE (100) is the NPN UE. At 220, the method includes determining the cell as the suitable cell in response to identifying the cell as the NPN cell if the NPN ID is detected in the acquired SIB1 information. At 222, the method includes selecting the cell for camping in response to identifying that the cell is the suitable cell and the UE (100) is the NPN UE.

FIG. 2C illustrates method for determining cell suitability for cell selection or cell reselection when the cell may be identified as the CAG cell at 214 of the FIG. 2A. At 224, the method includes identifying that the UE (100) is the CAG UE. At 226, the method includes determining the cell as a suitable cell in response to identifying the cell as the CAG cell if the CAG ID is detected in the acquired SIB1 information. At 228, the method includes selecting the cell for camping in response to identifying that the cell is the suitable cell and the UE (100) is the CAG UE having the allowed CAG list. At 230, the method includes determining whether the CAG ID detected in the acquired SIB1 information is available in the allowed CAG list. If the CAG ID detected in the acquired SIB1 information is available in the allowed CAG list then, at 232, the method includes camping on the selected cell. If the CAG ID detected in the acquired SIB1 information is not available in the allowed CAG list, at 234, the method includes barring the selected cell.

Figure 2D:
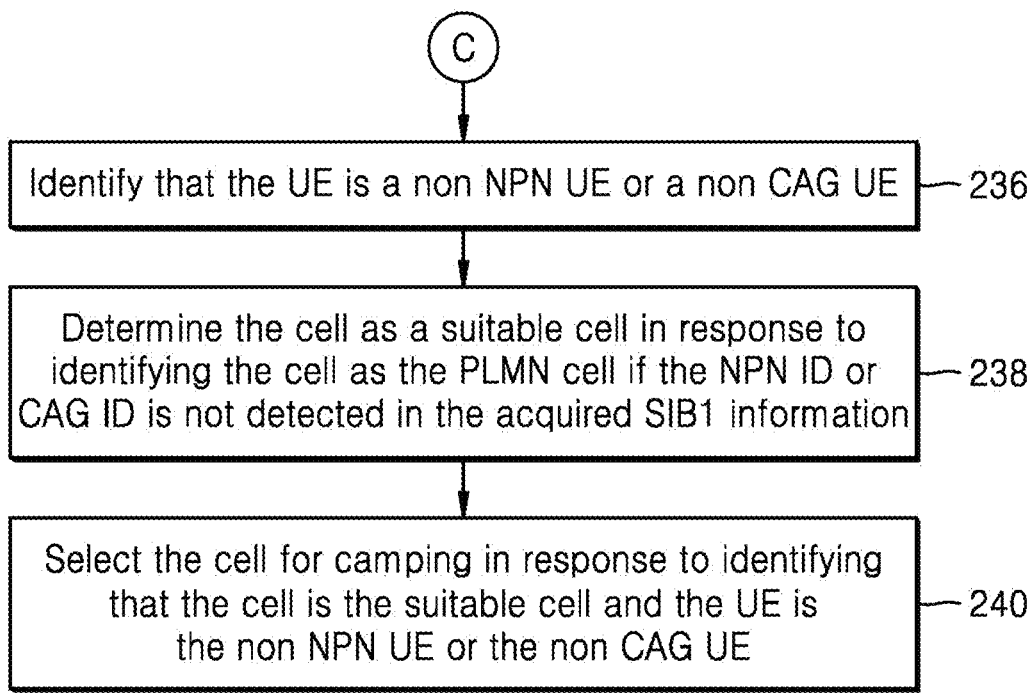

FIG. 2D illustrates method for determining cell suitability for cell selection or cell reselection when the cell may be identified as the PLMN cell at 216 of the FIG. 2A. At 236, the method includes identifying that the UE (100) is the non NPN UE or the non CAG UE. At 238, the method includes determining the cell as the suitable cell in response to identifying the cell as the PLMN cell if the NPN ID or CAG ID is not detected in the acquired SIB1 information. At 240, the method includes selecting the cell for camping in response to identifying that the cell is the suitable cell and the UE (100) is the non NPN UE or the non CAG UE.

Figure 2E:
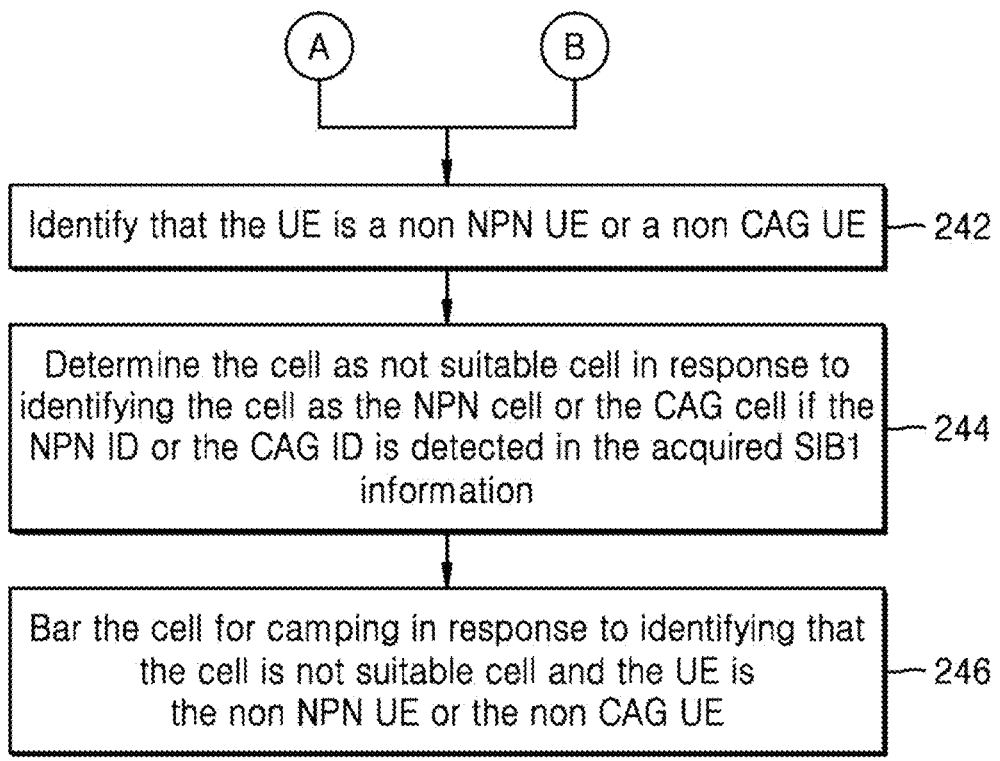

FIG. 2E illustrates method for determining cell suitability for cell selection or cell reselection when the cell may be identified as the NPN cell at 212 or as the CAG cell at 214 of the FIG. 2A. At 242, the method includes identifying that the UE (100) is the non NPN UE or the non CAG UE. At 244, the method includes determining the cell as not suitable cell in response to identifying the cell as the NPN cell or the CAG cell if the NPN ID or the CAG ID is detected in the acquired SIB1 information. At 246, the method includes barring the cell for camping in response to identifying that the cell is not suitable cell and the UE (100) is the non NPN UE or the non CAG UE.

Figure 2F:
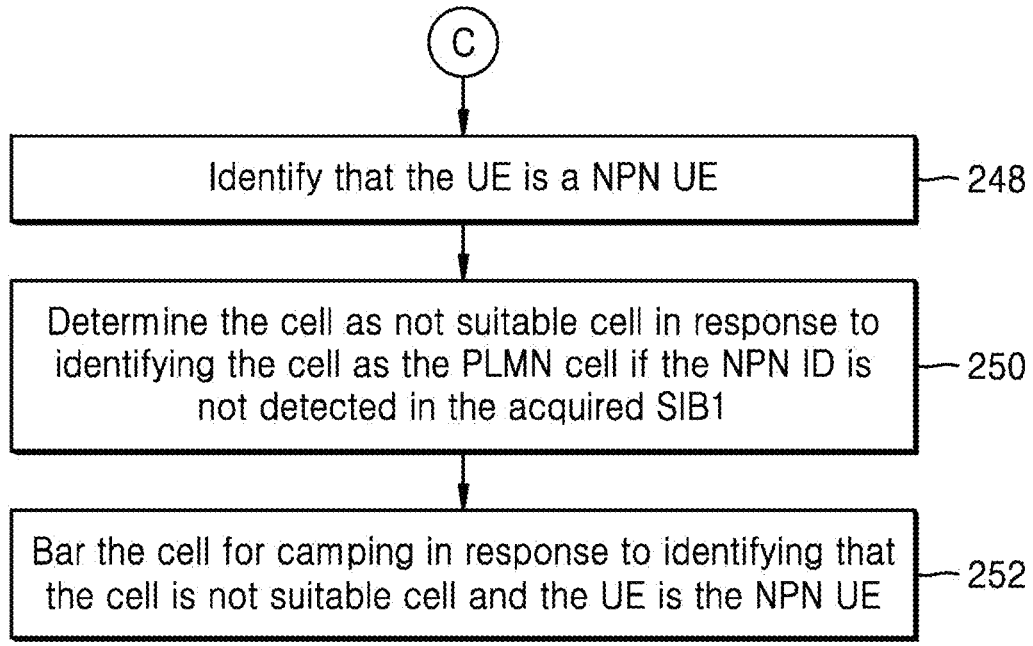

FIG. 2F illustrates method for determining cell suitability for cell selection or cell reselection when the cell may be identified as the PLMN cell at 216 of the FIG. 2A. At 248, the method includes identifying that the UE (100) is the NPN UE. At 250, the method includes determining the cell as not suitable cell in response to identifying the cell as the PLMN cell if the NPN ID is not detected in the acquired SIB1. At 252, the method includes barring the cell for camping in response to identifying that the cell is not suitable cell and the UE (100) is the NPN UE.

Figure 2G:
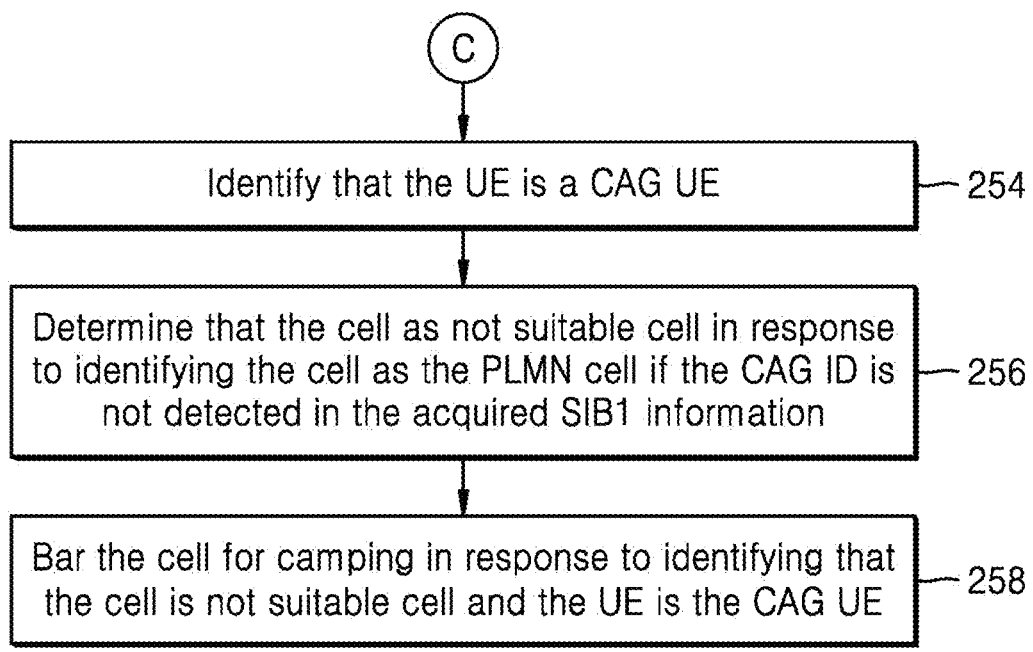

FIG. 2G illustrates method for determining cell suitability for cell selection or cell reselection when the cell may be identified as the PLMN cell at 216 of the FIG. 2A. At 254, the method includes identifying that the UE (100) is the CAG UE. At 256, the method includes determining that the cell as not suitable cell in response to identifying the cell as the PLMN cell if the CAG ID is not detected in the acquired SIB1 information. At 258, the method includes barring the cell for camping in response to identifying that the cell is not suitable cell and the UE (100) is the CAG UE.

FIG. 3A is flow chart (300a) illustrating the only NPN UE behavior when the cell is the NR cell, according to embodiments as disclosed herein. The operations (302a-312a) are performed by the processor (102).

At 302a, the method includes detecting that only NPN UE is in the idle mode or the inactive mode. At 304a, the method includes acquiring the MIB from cell and reading SIB1 regardless of barring bit setting in the acquired MIB. At 306a, the method includes checking the SIB1 for the NPN information or SIB-X in scheduling information of SIB1 is available. If the SIB1 for the NPN information or SIB-X in scheduling information of SIB1 is available then, at 310a, the method includes checking if the NPN ID/CAG ID is in the acquired list and the cell selection/reselection criteria is met. The cell selection/reselection criteria is defined in existing methods. If the NPN ID/CAG ID is in the acquired list and cell selection/reselection criteria is met then, at 312a, the method includes selecting the cell and camping on the cell. If the NPN ID/CAG ID does not match with the acquired list and cell selection/reselection criteria is not met then, the method performs the operation of 304. If the SIB1 for the NPN information or the SIB-X in the scheduling information of SIB1 is not available then, at 308*a*, the method includes barring the cell or barring the frequency associated the cell.

FIG. 3B is another flow chart (300*b*) illustrating the only NPN UE behavior when the cell is the NR cell, according to embodiments as disclosed herein. The operations (302*b*-316*b*) are performed by the processor (102).

At 302*b*, the method includes detecting that the only NPN UE is in the idle mode or the inactive mode. At 304*b*, the method includes acquiring the MIB from cell and reading SIB1 regardless of barring bit setting in the acquired MIB. At 306*b*, the method includes checking the SIB1 for the NPN information or SIB-X in scheduling information of SIB1 is available. If the SIB1 for the NPN information or SIB-X in scheduling information of SIB1 is available then, at 314*b*, the method includes checking if the NPN ID/CAG ID is in the acquired list and cell selection/reselection criteria is met. If the NPN ID/CAG ID is in the acquired list and cell selection/reselection criteria is met then, at 316*b*, the method includes selecting the cell and camping on the cell. If the NPN ID/CAG ID is not in the acquired list and cell selection/reselection criteria is not met then, at 308*b*, the method includes checking setting of IFRI-NPN bit in the SIB1. For example, at 308*b*, whether IFRI-NPN bit in SIB1 is set to "not barred/allowed" is determined by checking the setting of IFRI-NPN bit in the SIB1. At 310*b*, if IFRI-NPN bit in SIB1 is set to "not barred/allowed" then, the method includes baring the cell. At 312*b*, if IFRI-NPN bit in SIB1 is set to "barred/not allowed" then, the method includes barring the cell as well as this frequency.

FIG. 3C is another flow chart (300*c*) illustrating the only NPN UE behavior when the cell is the NR cell, according to embodiments as disclosed herein. The operations (302*c*-316*c*) are performed by the processor (102).

At 302*c*, the method includes detecting that the only NPN UE is in the idle mode or the inactive mode. At 304*c*, the method includes acquiring the MIB from cell and reading the SIB1 regardless of barring bit setting in the acquired MIB. At 306*c*, the method includes checking the SIB1 for the NPN information or SIB-X in scheduling information of SIB1. If the SIB1 for the NPN information or SIB-X in scheduling information of SIB1 is available then, at 314*b*, the method includes checking if the NPN ID/CAG ID is in the acquired list and the cell selection/reselection criteria is met. If the NPN ID/CAG ID is in the acquired list and the cell selection/reselection criteria is met then, at 316*c*, the method includes selecting the cell and camping on the cell. If the NPN ID/CAG ID does not match with the acquired list and the cell selection/reselection criteria is not met then, at 308*c*, the method includes checking setting of barring bit and IFRI bit in the MIB. For example, at 308*c*, whether the cellBarred bit is set as 'barred' and IFRI bit in MIB is set as "allowed" is determined by checking the setting of barring bit and IFRI bit in the MIB. If the cellBarred bit is set as 'barred' and IFRI bit in MIB is set as "allowed" then, at 310*c*, the method includes barring the cell. If cellBarred bit is set as 'barred' and IFRI bit in MIB is set as "notAllowed" then, at 312*c*, the method includes barring the frequency.

FIG. 4A is flow chart (400*a*) illustrating the only NPN UE behavior when the cell is a LTE cell, according to embodiments as disclosed herein. The operations (402*a*-414*a*) are performed by the processor (102).

At 402*a*, the method includes detecting that the only NPN UE is in the idle mode or the inactive mode. At 404*a*, the method includes acquiring the MIB and the SIB 1 from cell. At 406*a*, the method includes reading the NPN information/scheduling information regardless of setting of cellBarred-5GC/cellBarred-5GC-CRS bit in the SIB1. At 408*a*, the method includes checking the SIB1 for the NPN information or SIB-X in scheduling information of SIB1. If the SIB1 for the NPN information or SIB-X in scheduling information of SIB1 is available then, at 412*a*, the method includes checking if the NPN ID/CAG ID is in the acquired list and cell selection/reselection criteria is met. If the NPN ID/CAG ID is in the acquired list and the cell selection/reselection criteria is met then, at 414*a*, the method includes selecting the cell and camping on the cell. If the NPN ID/CAG ID is not in the acquired list and the cell selection/reselection criteria is not met then, the method performs the operation 404*a*. If the SIB1 for the NPN information or SIB-X in scheduling information of SIB1 then, at 410*a*, the method includes barring the cell or barring the frequency associated the cell.

FIG. 4B is flow chart (400*b*) illustrating the only NPN UE behavior when the cell is the LTE cell, according to embodiments as disclosed herein. The operations (402*b*-416*b*) are performed by the processor (102).

At 402*b*, the method includes detecting that the only NPN UE is in the idle mode or the inactive mode. At 404*b*, the method includes acquiring the MIB and the SIB1 from the cell. At 406*b*, the method includes reading the NPN information/scheduling information regardless of setting of cell-Barred-5GC/cellBarred-5GC-CRS bit in the SIB1. At 408*b*, the method includes checking the SIB1 for the NPN information or SIB-X in the scheduling information of SIB 1. If the SIB1 for the NPN information or SIB-X in scheduling information of SIB1 is available then, at 410*b*, the method includes checking if the NPN ID/CAG ID is in the acquired list and the cell selection/reselection criteria is met. If the NPN ID/CAG ID is in the acquired list and the cell selection/reselection criteria is met then, at 412*b*, the method includes selecting the cell and camping on the cell. If the NPN ID/CAG ID is not in the acquired list and the cell selection/reselection criteria is not met then, at 414*b*, the method includes checking setting of IFRI-NPN bit in the SIB1. For example, at 414*b*, whether IFRI-NPN bit in SIB1 is set to "not barred/allowed" is determined by checking the setting of IFRI-NPN bit in the SIB1. If IFRI-NPN bit in SIB1 is set to "not barred/allowed" then, at 416*b*, the method includes baring the cell. If IFRI-NPN bit in SIB1 is set to "barred/not allowed" then, at 418*b*, the method includes barring the cell as well as this frequency.

FIG. 4C is flow chart (400*c*) illustrating the only NPN UE behavior when the cell is the LTE cell, according to embodiments as disclosed herein. The operations (402*c*-418*c*) are performed by the processor (102).

At 402*c*, the method includes detecting that the only NPN UE is in the idle mode or the inactive mode. At 404*c*, the method includes acquiring the MIB and the SIB1 from the cell. At 406*c*, the method includes reading the NPN information/scheduling information regardless of setting of cell-Barred-5GC/cellBarred-5GC-CRS bit in the SIB1.

At 408*c*, the method includes checking the SIB1 for the NPN information or SIB-X in scheduling information of SIB1. If the SIB1 for the NPN information or SIB-X in scheduling information of SIB1 is available then, at 410*c*, the method includes checking if the NPN ID/CAG ID is in the acquired list and the cell selection/reselection criteria is met. If the NPN ID/CAG ID is in the acquired list and the cell selection/reselection criteria is met then, at 412*c*, the method includes selecting the cell and camping on the cell. If the NPN ID/CAG ID is not in the acquired list and the cell selection/reselection criteria is not met then, at 414*c*, the method includes checking setting of barring bit and IFRI bit in the SIB1. For example, at 414c, whether cellBarred-5GC/cellBarred-5GC-CRS bit is set as 'barred' and IFRI bit in SIB1 is set as 'allowed' is determined by checking the setting of barring bit and IFRI bit in the SIB1. If cellBarred-5GC/cellBarred-5GC-CRS bit is set as 'barred' and IFRI bit in SIB1 is set as 'allowed' then, at 416c, the method includes barring the cell. If cellBarred-5GC/cellBarred-5GC-CRS bit is set as 'barred' and IFRI bit in SIB1 is set as 'notAllowed' then, at 418c, the method includes baring the frequency.

FIG. 5A is flow chart (500a) illustrating the NPN UE behavior when the cell is the NR cell, according to embodiments as disclosed herein. The operations (502a-516a) are performed by the processor (102).

At 502a, the method includes detecting that the NPN UE is in the idle mode or the inactive mode. At 504a, the method includes acquiring the MIB from the cell and reading SIB1 regardless of barring bit setting in the acquired MIB. At 506a, the method includes checking the SIB1 for the NPN information or SIB-X in scheduling information of SIB1. If the SIB1 for the NPN information or SIB-X in the scheduling information of SIB1 is available then, at 508a, the method includes checking if the NPN ID/CAG ID is in the acquired list and the cell selection/reselection criteria is met. If the NPN ID/CAG ID is in the acquired list and the cell selection/reselection criteria is met then, at 510a, the method includes selecting the cell and camping on the cell. If the NPN ID/CAG ID is not in the acquired list and the cell selection/reselection criteria is not met then, at 512a, the method includes checking setting of barring bit and IFRI bit in the MIB. For example, at 512a, whether cellBarred bit is set as 'barred' and IFRI bit in MIB is set as 'allowed' is determined by checking the setting of barring bit and IFRI bit in the MIB. If cellBarred bit is set as 'barred' and IFRI bit in MIB is set as 'allowed' then, at 514a, the method includes barring the cell. If the cellBarred bit is set as 'barred' and IFRI bit in the MIB is set as 'notAllowed' then at 516a, the method includes barring the frequency.

FIG. 5B is flow chart (500b) illustrating the NPN UE behavior when the cell is the NR cell, according to embodiments as disclosed herein. The operations (502b-520b) are performed by the processor (102).

At 502b, the method includes detecting that the NPN UE is in the idle mode or the inactive mode. At 504b, the method includes acquiring the MIB from cell and reading SIB1 regardless of barring bit setting in the acquired MIB. At 506b, the method includes checking the SIB1 for the NPN information or SIB-X in scheduling information of SIB1. If the SIB1 for the NPN information or SIB-X in scheduling information of SIB1 is available then, at 508b, the method includes checking if the NPN ID/CAG ID is in the acquired list and the cell selection/reselection criteria is met. If the NPN ID/CAG ID is in the acquired list and cell selection/reselection criteria is met then, at 510b, the method includes selecting the cell and camping on the cell.

If the NPN ID/CAG ID is not in the acquired list and cell selection/reselection criteria is not met then, at 512b, the method includes detecting that the barring bit in the MIB is set as 'notBarred'. At 514b, the method includes checking the setting of NPN-barring bit and the IFRI-NPN bit in the SIB1. For example, at 514b, whether barring bit is set 'notbarred' and IFRI-NPN bit in SIB1 is set to 'not barred/allowed' is determined by checking the setting of NPN-barring bit and the IFRI-NPN bit in the SIB1.

If barring bit is set 'notbarred' and IFRI-NPN bit in SIB1 is set to 'not barred/allowed' then at 516b, the method includes camping on the cell if cell selection/reselection criteria is met.

At 517b, whether IFRI-NPN bit in SIB1 is set to 'barred/notAllowed' is determined by checking the IFRI-NPN bit in SIB1. If barring bit is set 'barred' and IFRI-NPN bit in SIB1 is set to 'barred/notAllowed' then at 518b, the method includes barring the cell as well as this frequency. If barring bit is set 'barred' and IFRI-NPN bit in SIB1 is set to 'not barred/allowed' then at 520b, the method includes barring the cell.

FIG. 5C is flow chart (500c) illustrating the NPN UE behavior when the cell is the NR cell, according to embodiments as disclosed herein. The operations (502c-518c) are performed by the processor (102).

At 502c, the method includes detecting that the NPN UE is in the idle mode or the inactive mode. At 504c, the method includes acquiring the MIB from cell and reading SIB1 regardless of barring bit setting in the acquired MIB. At 506c, the method includes checking the SIB1 for the NPN information or SIB-X in scheduling information of SIB1. If the SIB1 for the NPN information or SIB-X in scheduling information of SIB1 is available then, at 508c, the method includes checking if the NPN ID/CAG ID is in the acquired list and the cell selection/reselection criteria is met. If the NPN ID/CAG ID is in the acquired list and the cell selection/reselection criteria is met then, at 510c, the method includes selecting the cell and camping on the cell. If the NPN ID/CAG ID is not in the acquired list and the cell selection/reselection criteria is not met then, at 512c, the method includes checking the setting of the NPN-barring bit and the IFRI-NPN bit in the SIB1. For example, at 512c, whether barring bit is set as 'notbarred' and IFRI-NPN bit in SIB1 is set as 'allowed' is determined by checking the setting of the NPN-barring bit and the IFRI-NPN bit in the SIB1.

If barring bit is set as 'notbarred' and IFRI-NPN bit in SIB1 is set as 'allowed' then then at 514c, the method includes camping on the cell if the cell selection/reselection criteria is met.

At 515c, whether IFRI-NPN bit in SIB1 is set as 'notAllowed' is determined by checking the IFRI-NPN bit in SIB1. If barring bit is set as 'barred' and IFRI-NPN bit in SIB1 is set as 'notAllowed' then at 516c, the method includes barring the cell and this frequency. If barring bit is set as 'barred' and IFRI-NPN bit in the SIB1 is set as 'allowed' then at 518c, the method includes barring the cell.

FIG. 6A is flow chart (600a) illustrating the NPN UE behavior when the cell is the LTE cell, according to embodiments as disclosed herein. The operations (602a-618a) are performed by the processor (102).

At 602a, the method includes detecting that the NPN UE is in the idle mode or the inactive mode. At 604a, the method includes acquiring the MIB and the SIB 1 from the cell. At 606a, the method includes reading the NPN information/scheduling information regardless of setting of cellBarred-5GC/cellBarred-5GC-CRS bit in the SIB1. At 608a, the method includes checking the SIB1 for the NPN information or SIB-X in scheduling information of SIB1. If the SIB1 for the NPN information or SIB-X in scheduling information of SIB1 is available then, at 612a, the method includes checking if the NPN ID/CAG ID is in the acquired list and the cell selection/reselection criteria is met. If the NPN ID/CAG ID is in the acquired list and the cell selection/reselection criteria is met then, at 614a, the method includes selecting the cell and camping on the cell. If the NPN ID/CAG ID is not in the acquired list and the cell selection/reselection criteria is not met then, at 614a, the method includes checking setting of cellBarred-5GC/cellBarred-5GC-CRS bit and IFRI-5GC bit in SIB1. For example, at 614a, whether barring bit is set as 'barred' and IFRI-5GC bit in SIB1 is set as 'allowed' is determined by checking the setting of cellBarred-5GC/cellBarred-5GC-CRS bit and IFRI-5GC bit in SIB1.

If barring bit is set as 'barred' and IFRI-5GC bit in SIB1 is set as 'allowed' then at 616*a*, the method includes barring the cell. If barring bit is set as 'barred' and IFRI-5GC bit in SIB1 is set as 'notAllowed' then at 618*a*, the method includes barring cell and this frequency.

FIG. 6B is flow chart (600*b*) illustrating the NPN UE behavior when the cell is the LTE cell, according to embodiments as disclosed herein. The operations (602*b*-622*b*) are performed by the processor (102).

At 602*b*, the method includes detecting that the NPN UE is in the idle mode or the inactive mode. At 604*b*, the method includes acquiring the MIB and the SIB1 from the cell. At 606*b*, the method includes reading the NPN information/scheduling information regardless of setting of cellBarred-5GC/cellBarred-5GC-CRS bit in the SIB1. At 608*b*, the method includes checking the SIB1 for the NPN information or SIB-X in scheduling information of SIB1. If the SIB1 for the NPN information or SIB-X in scheduling information of SIB1 then, at 610*b*, the method includes checking if the NPN ID/CAG ID is in the acquired list and cell selection/reselection criteria is met. If the NPN ID/CAG ID is in the acquired list and the cell selection/reselection criteria is met then, at 612*b*, the method includes selecting the cell and camping on the cell. If the NPN ID/CAG ID is not in the acquired list and the cell selection/reselection criteria is not met then, at 614*b*, the method includes detecting that cellBarred-5GC/cellBarred-5GC-CRS bit in SIB1 is set as 'not Barred.

At 616*b*, the method includes checking the setting of NPN-barring bit and IFRI-NPN bit in SIB1. For example, at 616*b*, whether barring bit is set 'notbarred' and IFRI-NPN bit in SIB1 is set to 'not barred/allowed' is determined by checking the setting of NPN-barring bit and IFRI-NPN bit in SIB1.

If barring bit is set 'notbarred' and IFRI-NPN bit in SIB1 is set to 'not barred/allowed' then at 618*b*, the method includes camp on the cell if cell selection/reselection criteria is met.

At 619*b*, whether IFRI-NPN bit in SIB1 is set to 'barred/notAllowed' is determined by checking IFRI-NPN bit in SIB1. If barring bit is set 'barred' and IFRI-NPN bit in SIB1 is set to 'barred/notAllowed' then, at 620*b*, the method includes barring the cell as well as this frequency. If barring bit is set 'barred' and IFRI-NPN bit in SIB1 is set to 'not barred/allowed' then at 622*b*, the method includes barring the cell.

FIG. 6C is flow chart (600*c*) illustrating the NPN UE behavior when the cell is the LTE cell, according to embodiments as disclosed herein. The operations (602*c*-620*c*) are performed by the processor (102).

At 602*c*, the method includes detecting that the NPN UE is in an idle mode or an inactive mode. At 604*c*, the method includes acquiring the MIB and the SIB1 from cell. At 606*c*, the method includes reading the NPN information/scheduling information regardless of setting of cellBarred-5GC/cellBarred-5GC-CRS bit in the SIB1. At 608*c*, the method includes checking the SIB1 for the NPN information or SIB-X in scheduling information of SIB1. If the SIB1 for the NPN information or SIB-X in scheduling information of SIB1 then, at 610*c*, the method includes checking if the NPN ID/CAG ID is in the acquired list and the cell selection/reselection criteria is met.

If the NPN ID/CAG ID is in the acquired list and the cell selection/reselection criteria is met then, at 612*c*, the method includes selecting the cell and camping on the cell. If the NPN ID/CAG ID is not in the acquired list and the cell selection/reselection criteria is not met then, at 614*c*, the method includes checking the setting of NPN-barring bit and IFRI-NPN bit in the SIB1. For example, at 614*c*, whether barring bit is set as 'notbarred' and IFRI-NPN bit in SIB1 is set as 'allowed' is determined by checking the setting of NPN-barring bit and IFRI-NPN bit in the SIB1.

If barring bit is set as 'notbarred' and IFRI-NPN bit in SIB1 is set as 'allowed' then, at 616*c*, the method includes camping on the cell if cell selection/reselection criteria is met.

At 617*c*, whether IFRI-NPN bit in SIB1 is set as 'notAllowed' is determined by checking IFRI-NPN bit in SIB1. If barring bit is set as 'barred' and IFRI-NPN bit in SIB1 is set as 'notAllowed' then at 618*c*, the method includes barring the cell and this frequency. If barring bit is set as 'barred' and IFRI-NPN bit in SIB1 is set as 'allowed' then, at 620*c*, the method includes barring the cell.

FIG. 7A is flow chart (700*a*) illustrating legacy/Non-NPN UE behavior when the cell is the NR cell, according to embodiments as disclosed herein. The operations (702*a*-716*a*) are performed by the processor (102).

At 702*a*, the method includes detecting that the legacy/Non-NPN UE is in the idle mode/the inactive mode. At 704*a*, the method includes acquiring the MIB from the cell. At 706*a*, the method includes checking the setting of cellBarred bit and the IFRI bit in the MIB. For example, at 706*a*, whether the cellBarred bit in the MIB is set as 'notBarred' is determined by checking the setting of cellBarred bit.

If the cellBarred bit in the MIB is set as 'notBarred' then at 708*a*, the method includes reading the SIB1 from the cell. At 710*a*, the method includes selecting the cell and camping on the cell if the cell selection/reselection criteria is met.

At 711*a*, whether IFRI bit is set as 'notAllowed' is determined. If the cellBarred bit in MIB is set as 'barred' and IFRI bit is set as 'notAllowed', then at 712*a*, the method do not read SIB1 from the cell. At 714*a*, the method includes barring the cell and this frequency. If cellBarred bit in MIB is set as 'barred' and IFRI bit is set as 'allowed' then at 720*a*, the method do not read SIB1 from the cell and bar the cell.

FIG. 7B is flow chart (700*b*) illustrating the legacy/Non-NPN UE behavior when the cell is the LTE cell, according to embodiments as disclosed herein. The operations (702*b*-716*b*) are performed by the processor (102).

At 702*b*, the method includes detecting that the legacy/Non-NPN UE is in an idle mode or inactive mode. At 704*b*, the method includes acquiring the MIB and SIB1 from the cell. At 706*b*, the method includes checking setting of cellBarred-5GC/cellBarred-5GC-CRS bit and IFRI-5GC bit in the SIB1. For example, at 706*b*, whether barring bit in SIB1 is set as 'notBarred' is determined.

If barring bit in SIB1 is set as 'notBarred' then at 708*b*, the method includes reading further SI from the cell. At 710*b*, the method includes selecting the cell and camping on the cell if cell selection/reselection criteria is met.

At 711*b*, whether IFRI-5GC bit is set as 'notAllowed' is determined. If barring bit in the SIB1 is set as 'barred' and IFRI-5GC bit is set as 'notAllowed' then at 712*b*, the method do not read further SI from the cell. At 714*b*, the method includes barring the cell and this frequency. If barring bit in the SIB1 is set as 'barred' and IFRI-5GC bit is set as 'allowed' then, at 714*b*, the method do not read further SI from the cell and bar the cell.

Figure 8:
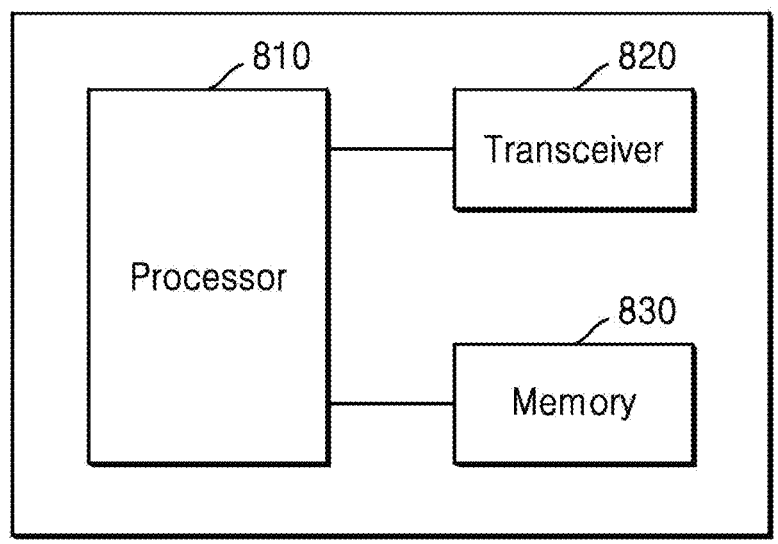
FIG. 8 illustrates the base station according to embodiments of the present disclosure.

FIG. 8 schematically illustrates the base station according to embodiments of the present disclosure.

Referring to the FIG. 8, the Base station 800 may include a processor 810, a transceiver 820 and a memory 830. However, all of the illustrated components are not essential. The Base station 800 may be implemented by more or less components than those illustrated in FIG. 8. In addition, the processor 810 and the transceiver 820 and the memory 830 may be implemented as a single chip according to another embodiment.

The aforementioned components will now be described in detail.

The processor 810 may include one or more processors or other processing devices that control the proposed function, process, and/or method. Operation of the Base station 800 may be implemented by the processor 810.

The transceiver 820 may include a RF transmitter for up-converting and amplifying a transmitted signal, and a RF receiver for down-converting a frequency of a received signal. However, according to another embodiment, the transceiver 820 may be implemented by more or less components than those illustrated in components.

The transceiver 820 may be connected to the processor 810 and transmit and/or receive a signal. The signal may include control information and data. In addition, the transceiver 820 may receive the signal through a wireless channel and output the signal to the processor 810. The transceiver 820 may transmit a signal output from the processor 810 through the wireless channel.

The memory 830 may store the control information or the data included in a signal obtained by the Base station 800. The memory 830 may be connected to the processor 810 and store at least one instruction or a protocol or a parameter for the proposed function, process, and/or method. The memory 830 may include read-only memory (ROM) and/or random access memory (RAM) and/or hard disk and/or CD-ROM and/or DVD and/or other storage devices.

In an exemplary embodiment, the processor 810 is configured to broadcast a system information block 1 (SIB 1) and a Master information block (MIB), and wherein the MIB includes an indicator indicating whether the cell is barred for the UE.

Figure 9:
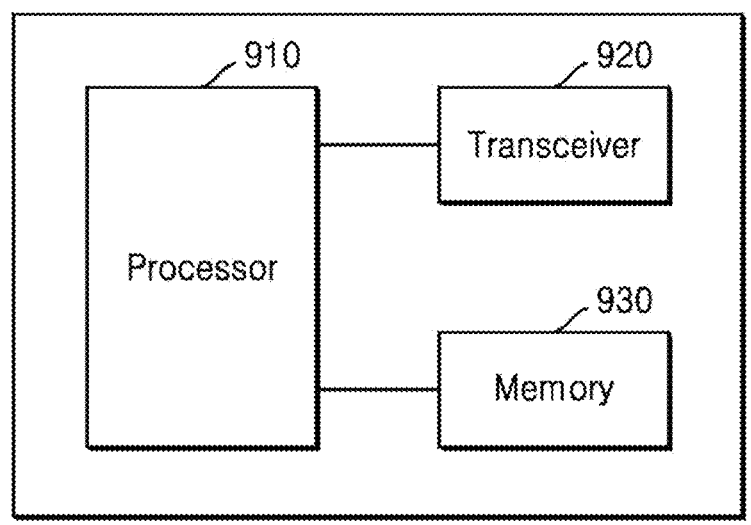
FIG. 9 illustrates a user equipment (UE) according to embodiments of the present disclosure.

FIG. 9 illustrates a user equipment (UE) according to embodiments of the present disclosure.

Referring to the FIG. 9, the UE 900 may include a processor 910, a transceiver 920 and a memory 930. However, all of the illustrated components are not essential. The UE 900 may be implemented by more or less components than those illustrated in FIG. 9. In addition, the processor 910 and the transceiver 920 and the memory 930 may be implemented as a single chip according to another embodiment.

The aforementioned components will now be described in detail.

The processor 910 may include one or more processors or other processing devices that control the proposed function, process, and/or method. Operation of the UE 900 may be implemented by the processor 910.

The transceiver 920 may include a RF transmitter for up-converting and amplifying a transmitted signal, and a RF receiver for down-converting a frequency of a received signal. However, according to another embodiment, the transceiver 920 may be implemented by more or less components than those illustrated in components.

The transceiver 920 may be connected to the processor 910 and transmit and/or receive a signal. The signal may include control information and data. In addition, the transceiver 920 may receive the signal through a wireless channel and output the signal to the processor 910. The transceiver 920 may transmit a signal output from the processor 910 through the wireless channel.

The memory 930 may store the control information or the data included in a signal obtained by the UE 900. The memory 930 may be connected to the processor 910 and store at least one instruction or a protocol or a parameter for the proposed function, process, and/or method. The memory 930 may include read-only memory (ROM) and/or random access memory (RAM) and/or hard disk and/or CD-ROM and/or DVD and/or other storage devices.

In an exemplary embodiment, the processor 910 configured to; control the transceiver 920 to receive a system information block 1 (SIB 1) which is broadcasted from a base station (BS) of a cell, identify whether the cell is a Non-Public Network (NPN) cell based on whether information of a NPN is included in the SIB 1, wherein the NPN cell is a cell allowed to be accessed by the UE in the NPN, and access the cell, when the cell is identified as the NPN cell.

The various actions, acts, blocks, steps, or the like in the flow charts (200, 300a, 300b, 300c, 400a, 400b, 400c, 500a, 500b, 500c, 600a, 600b, 600c, 700a, and 700c) may be performed in the order presented, in a different order or simultaneously. Further, in some embodiments, some of the actions, acts, blocks, steps, or the like may be omitted, added, modified, skipped, or the like without departing from the scope of the disclosure.

The embodiments disclosed herein can be implemented through at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method performed by a user equipment (UE) in a wireless communication system, the method comprising:
   receiving a master information block (MIB) message including cell barred information indicating whether a cell is barred or not barred;
   receiving a system information block 1 (SIB 1) message; and
   identifying whether the cell is barred, based on the SIB1 message, in case that the cell barred information indicates that the cell is not barred,
   wherein in case that the SIB1 message does not include non-public network (NPN) information, the cell is identified as a barred cell, and
   wherein in case that the SIB 1 message includes the NPN information, the cell is identified as a candidate cell for cell selection or cell reselection.

2. The method of claim 1, wherein the NPN information includes at least one of a network identifier (NID), a public land mobile network (PLMN) identifier, or a closed access groups (CAG) identifier.

3. The method of claim 1, further comprising:
performing cell selection or reselection on the cell in case that the NPN information including at least one of a NID, or a CAG identifier matches allowed NPN information for the UE.

4. The method of claim 1, further comprising:
receiving range of physical cell identity (PCI) values reserved for use by CAG cells.

5. The method of claim 1,
wherein the MIB message further includes intra frequency reselection information, and
wherein the cell is barred and a frequency of the cell is barred in case that the intra frequency reselection information is set to not allowed and the cell barred information is set to barred.

6. The method of claim 1,
wherein the MIB message further includes intra frequency reselection information, and
wherein the cell is barred and a frequency of the cell is allowed in case that the intra frequency reselection information is set to allowed and the cell barred information is set to barred.

7. A user equipment (UE), in a wireless communication system, the UE comprising:
a transceiver; and
at least one processor coupled with the transceiver and configured to:
receive a master information block (MIB) message including cell barred information indicating whether a cell is barred or not barred,
receive a system information block 1 (SIB 1) message, and
identify whether the cell is barred, based on the SIB1 message, in case that the cell barred information indicates that the cell is not barred,
wherein in case that the SIB1 message does not include non-public network (NPN) information, the cell is identified as a barred cell, and
wherein in case that the SIB 1 message includes the NPN information, the cell is identified as a candidate cell for cell selection or cell reselection.

8. The UE of claim 7, wherein the NPN information includes at least one of a network identifier (NID), a public land mobile network (PLMN) identifier, or a closed access groups (CAG) identifier.

9. The UE of claim 7, the at least one processor is further configured to:
perform cell selection or reselection on the cell in case that the NPN information including at least one of a NID, or a CAG identifier matches allowed NPN information for the UE.

10. The UE of claim 7, the at least one processor is further configured to:
receive range of physical cell identity (PCI) values reserved for use by CAG cells.

11. The UE of claim 7,
wherein the MIB message further includes intra frequency reselection information, and
wherein the cell is barred and a frequency of the cell is barred in case that the intra frequency reselection information is set to not allowed and the cell barred information is set to barred.

12. The UE of claim 7,
wherein the MIB message further includes intra frequency reselection information, and
wherein the cell is barred and a frequency of the cell is allowed in case that the intra frequency reselection information is set to allowed and the cell barred information is set to barred.

13. A method performed by a base station (BS) in a wireless communication system, the method comprising:
transmitting a master information block (MIB) message including cell barred information indicating whether a cell is barred or not barred; and
transmitting a system information block 1 (SIB 1) message,
wherein whether the cell is barred is identified based on the SIB1 message, in case that the cell barred information indicates that the cell is not barred,
wherein in case that the SIB1 message does not include non-public network (NPN) information, the cell is identified as a barred cell, and
wherein in case that the SIB 1 message includes the NPN information, the cell is identified as a candidate cell for cell selection or cell reselection.

\* \* \* \* \*